(12) United States Patent
Dovey et al.

(10) Patent No.: US 11,312,473 B2
(45) Date of Patent: Apr. 26, 2022

(54) AIRCRAFT SLAT AERO-RESTORATION SEAL DOOR AND METHOD THEREFOR

(71) Applicant: The Boeing Company, Chicago, IL (US)

(72) Inventors: John V. Dovey, Seattle, WA (US); Ethan L. Clemmitt, Seattle, WA (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 16/426,739

(22) Filed: May 30, 2019

(65) Prior Publication Data
US 2020/0377195 A1 Dec. 3, 2020

(51) Int. Cl.
*B64C 7/00* (2006.01)
*B64C 9/22* (2006.01)
*B64C 9/32* (2006.01)

(52) U.S. Cl.
CPC ............. *B64C 7/00* (2013.01); *B64C 9/22* (2013.01); *B64C 9/323* (2013.01)

(58) Field of Classification Search
CPC ..................................... B64C 7/00; B64C 9/02
See application file for complete search history.

(56) References Cited

U.S. PATENT DOCUMENTS

| | | | |
|---|---|---|---|
| 3,486,720 A | 12/1969 | Seglem et al. | |
| 4,341,436 A | 7/1982 | Kanno et al. | |
| 5,544,847 A | 8/1996 | Bliesner | |
| 8,657,236 B2 | 2/2014 | Triches, Jr. et al. | |
| 2013/0214096 A1* | 8/2013 | Wilson | B64C 3/50 244/213 |
| 2016/0297541 A1 | 10/2016 | Anderson | |
| 2017/0167610 A1* | 6/2017 | Blades | B64C 9/18 |
| 2017/0355445 A1* | 12/2017 | Bekircan | B64C 9/02 |
| 2018/0135678 A1* | 5/2018 | Garbe | H02G 3/22 |
| 2019/0112029 A1* | 4/2019 | Turner | B64C 9/02 |
| 2019/0241250 A1* | 8/2019 | Hencke | B64C 9/18 |

FOREIGN PATENT DOCUMENTS

GB 2504744 2/2014
JP 2013219878 A * 10/2013

OTHER PUBLICATIONS

Moon et al.; "Application of 3D Printing for Designing Light-Weight Unmanned Aerial Vehicle Wing Structures", International Journal of Precision Engineering and Manufacturing-Green Technology, vol. 1, No. 3, 2014 pp. 223-228; https://link.springer.com/content/pdf/10.1007%2Fs40684-014-0028-x.pdf.
Dovey, John; U.S. Appl. No. 16/160,002, filed Oct. 15, 2018.

* cited by examiner

*Primary Examiner* — Richard R. Green
*Assistant Examiner* — William L Gmoser
(74) *Attorney, Agent, or Firm* — Perman & Green, LLP

(57) ABSTRACT

A seal is provided. The seal includes a seal panel having lateral sides. The seal also includes a seal locking mechanism coupled to the seal panel. The seal locking mechanism is configured to resiliently move, under impetus of an actuator, between an unbowed position of the seal locking mechanism and a bowed position of the seal locking mechanism.

20 Claims, 22 Drawing Sheets

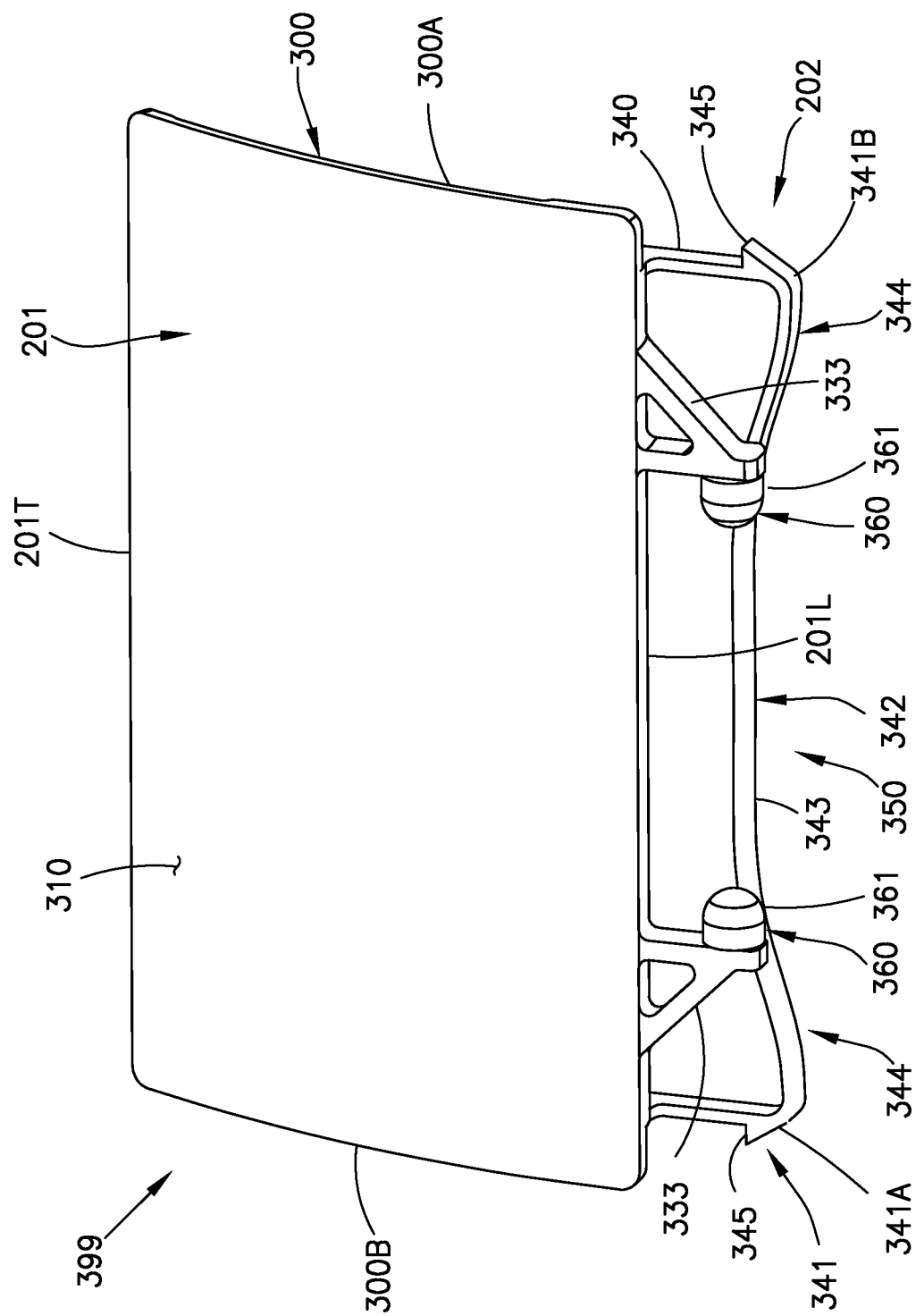

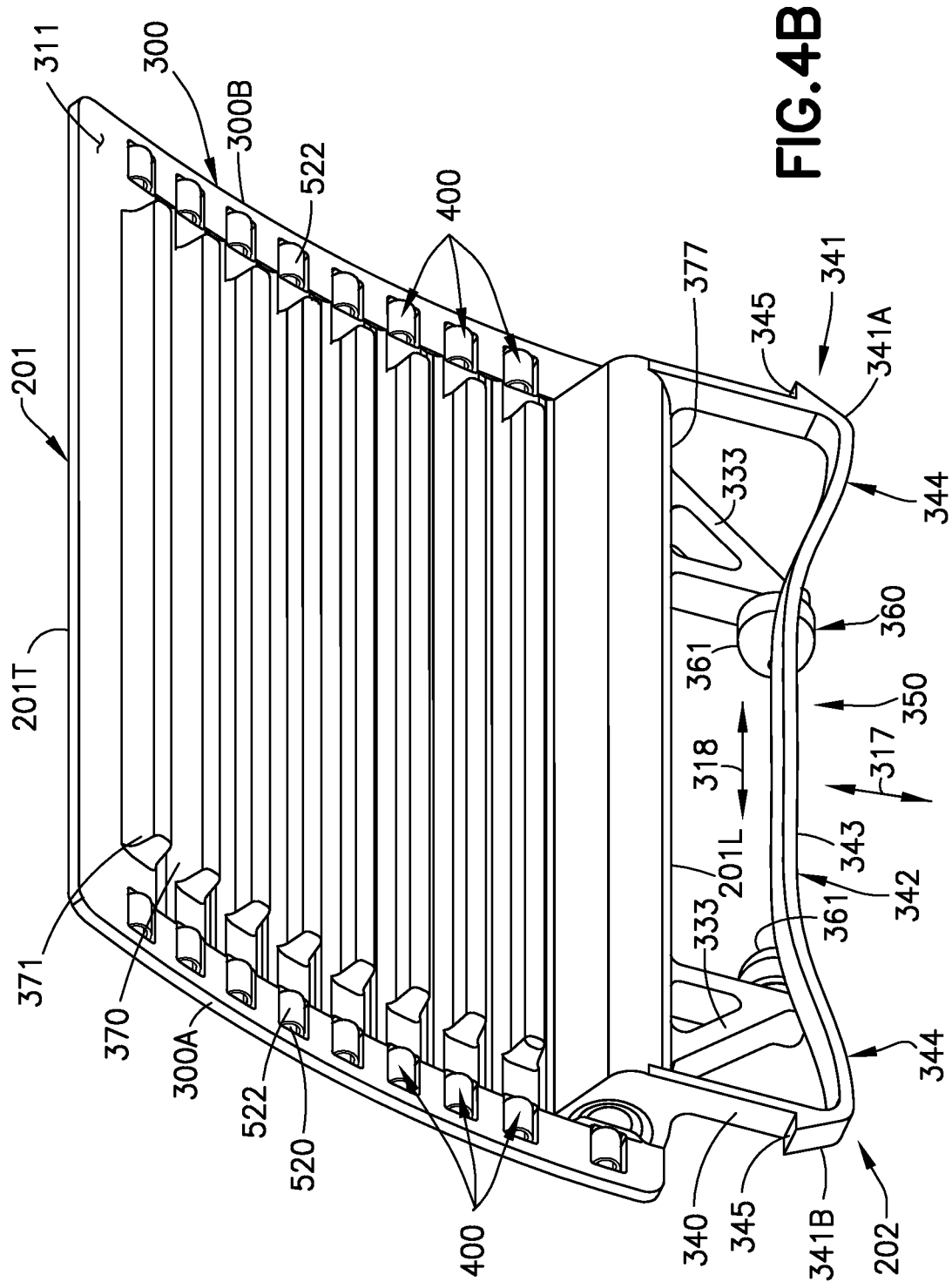

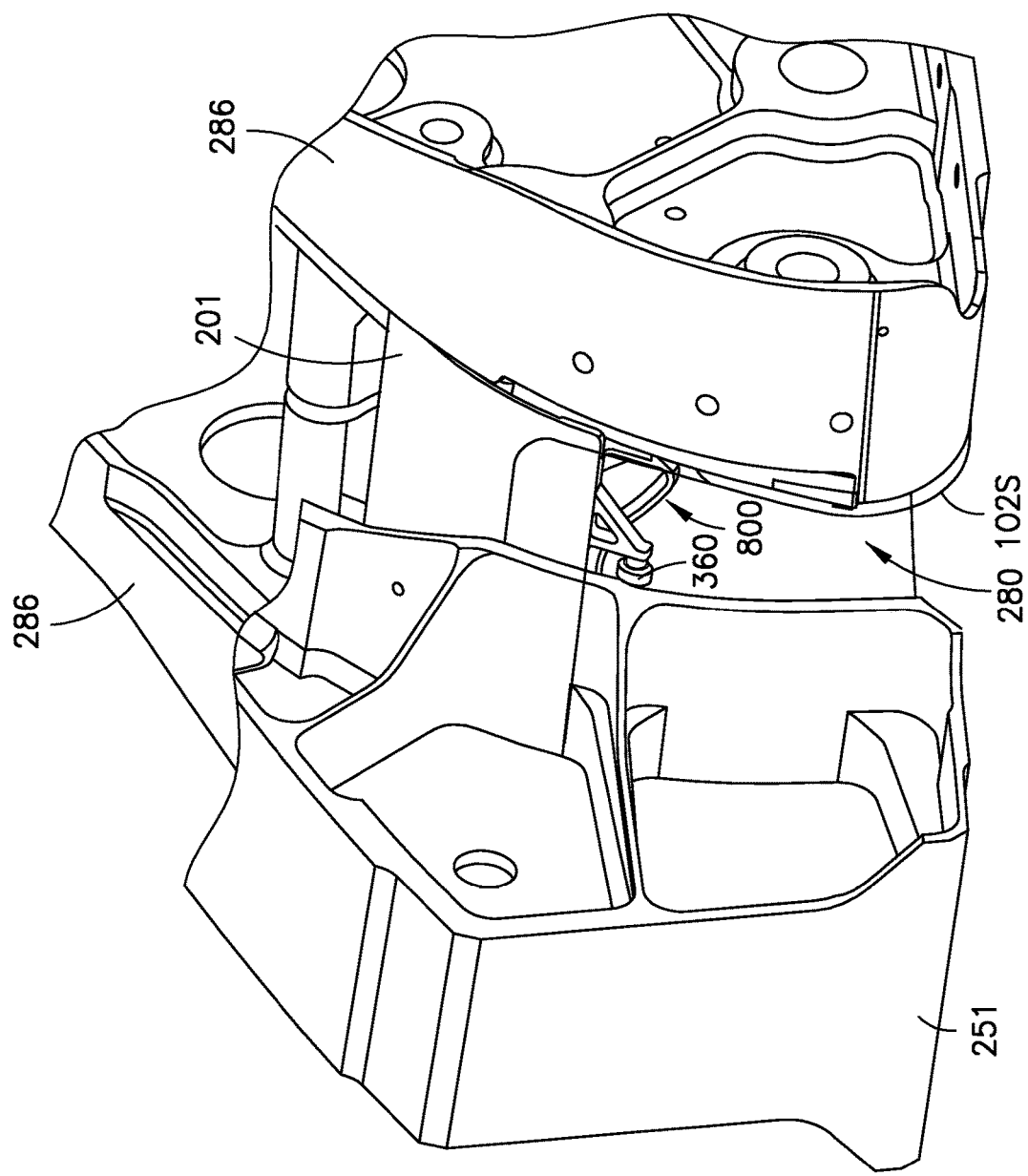

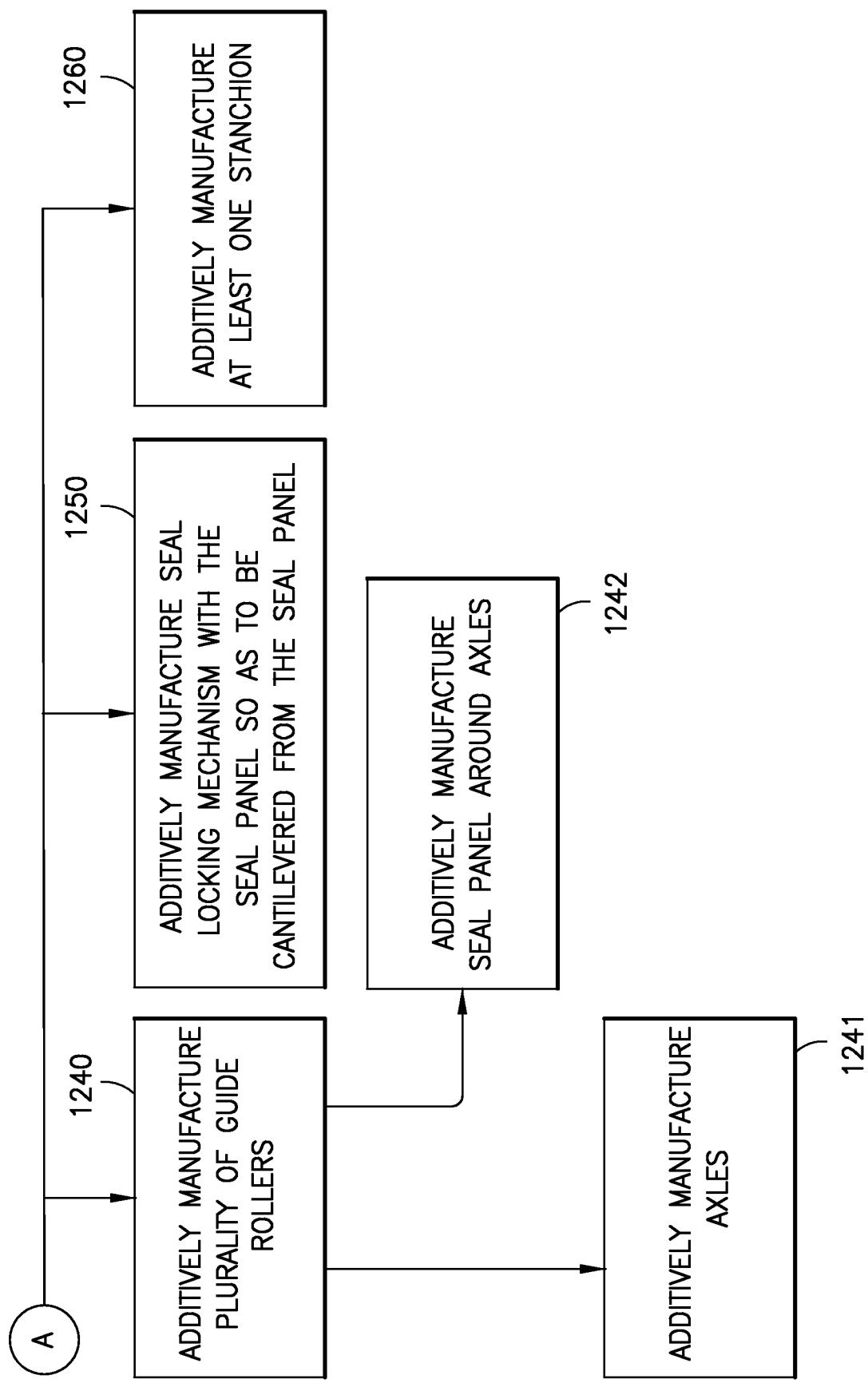

AIRCRAFT SLAT AERO-RESTORATION SEAL DOOR AND METHOD THEREFOR

BACKGROUND

1. Field

The exemplary embodiments generally relate to aerodynamic control surfaces of aircraft and more particularly to slat aero-restoration seals.

2. Brief Description of Related Developments

Slats are aerodynamic surfaces on the leading edges of the wings of, for example, a fixed or variable wing aircraft that, when extended, enable the wing to operate at a higher angle of attack and/or a slower speed without stalling. A higher coefficient of lift is produced as a result of angle of attack and air speed so that, by extending the slats, an aircraft can fly at slower speeds, and/or take off and land within shorter distances. Slats are usually used while taking off, landing, or performing other low speed maneuvers, and are usually retracted during normal, high speed flight so as to minimize their aerodynamic drag.

As the slats extend the slat track protrudes from a slat track opening on the leading edge of the wing. This slat track opening is substantially closed by an aero-restoration seal door. Typically the aero-restoration seal door is actuated by torsion springs. For example, one typical example of an aero-restoration door is a pivot type door that is coupled to the torsions springs by crank arms. As the slat extends the torsion springs are allowed to rotate the crank arms, and the aero-restoration seal door mounted thereto, so that the aero-restoration seal door is extended to block or substantially seal the slat track opening. As the slat retracts, the slat track rotates the aero-restoration seal door to a retracted position within the wing against the bias of the torsion springs. Another typical example of an aero-restoration seal door is a track guided door where, as the slat is extended, the torsion springs are allowed to rotate the crank arms to effect movement of the aero-restoration seal door along guide tracks so as to block or substantially seal the slat track opening. As the slat retracts, the slat track pushes the aero-restoration seal door along the guide tracks to a retracted position within the wing against the bias of the torsion springs. These typical aero-restoration seal doors include many parts that increase the weight and complexity of the aircraft.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a seal comprising: a seal panel having lateral sides; and a seal locking mechanism coupled to the seal panel, the seal locking mechanism being configured to resiliently move, under impetus of an actuator, between an unbowed position and a bowed position.

Another example of the subject matter according to the present disclosure relates to a method for sealing a slat track opening on a wing of an aircraft with a seal, the method comprising: positioning a seal panel substantially within the slat track opening under impetus of a displacement of an actuator, where the seal panel has lateral sides that engage slat seal tracks of the wing, where the seal includes the seal panel and a seal locking mechanism coupled to the seal panel; locking the seal locking mechanism with a lock surface of the slat seal tracks, where the seal locking mechanism resiliently moves under the impetus of the displacement of the actuator such that the seal locking mechanism engages the lock surface of the slat seal tracks.

Still another example of the subject matter according to the present disclosure relates to a method of forming a seal, the method comprising: additively manufacturing as a monolithic structure a seal panel having lateral sides; and a seal locking mechanism coupled to the seal panel, the seal locking mechanism being configured to resiliently move, under impetus of an actuator, between an unbowed position and a bowed position.

Yet another example of the subject matter according to the present disclosure relates to an aircraft comprising: a wing having a slat track opening; and a seal for sealing the slat track opening, the seal including: a seal panel having lateral sides; and a seal locking mechanism coupled to the seal panel, the seal locking mechanism being configured to resiliently move, under impetus of an actuator, between an unbowed position and a bowed position.

BRIEF DESCRIPTION OF THE DRAWINGS

Figure 1:
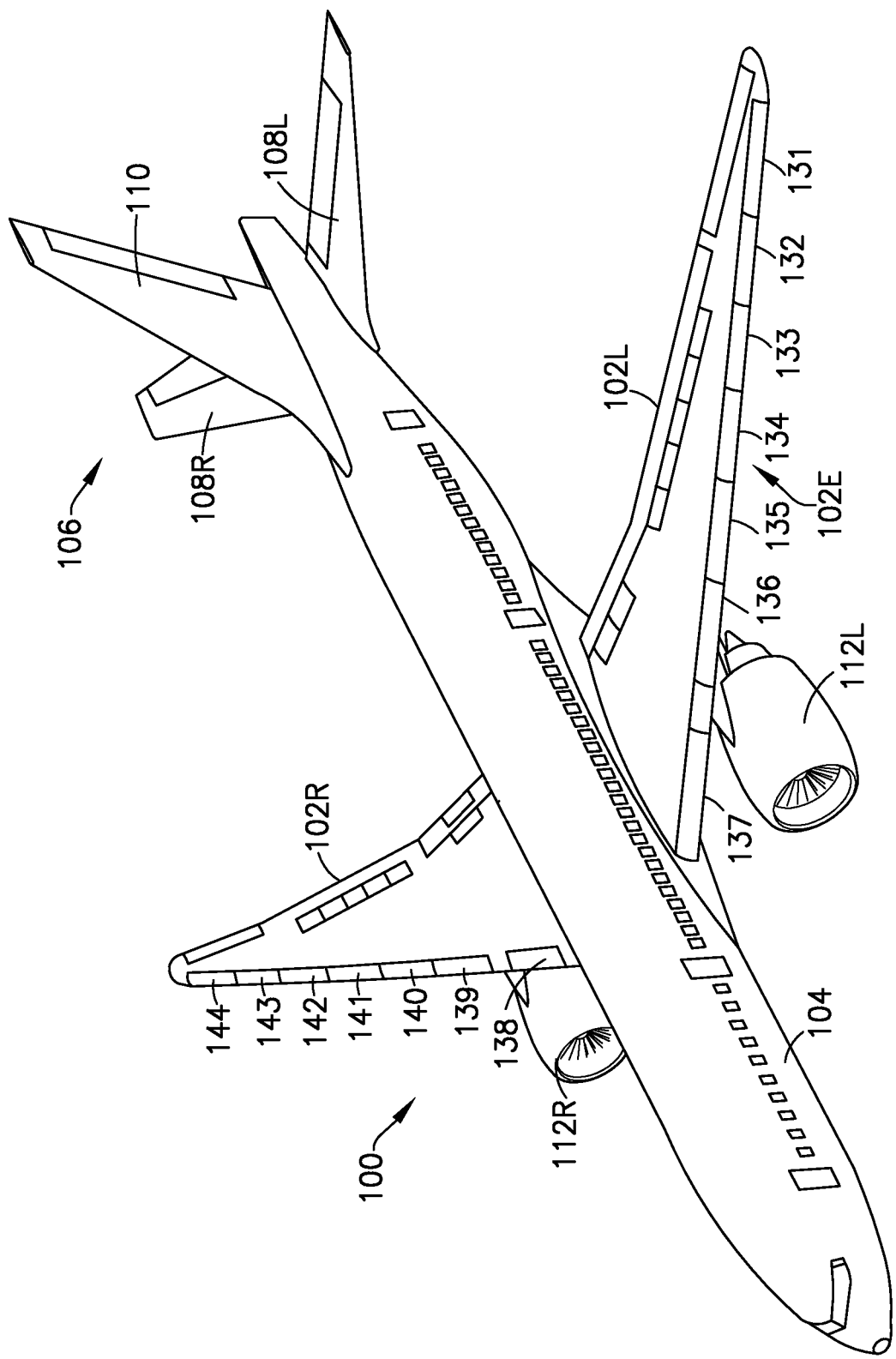
Figure 2A:
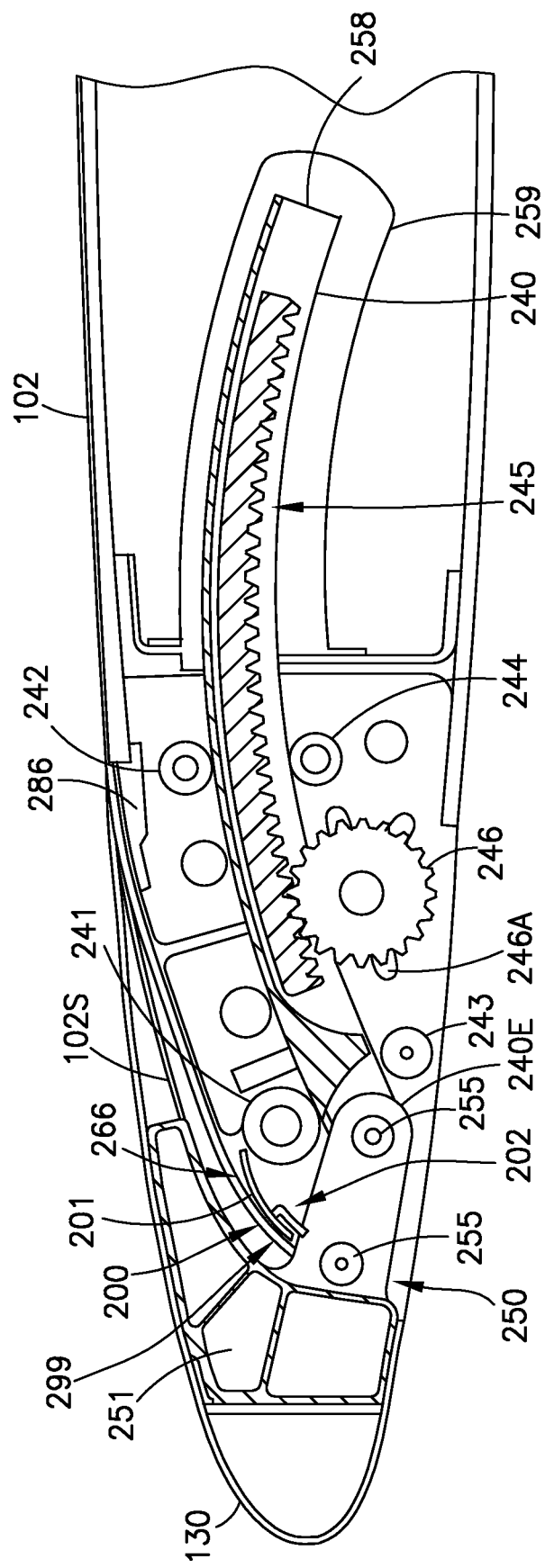
Figure 2B:
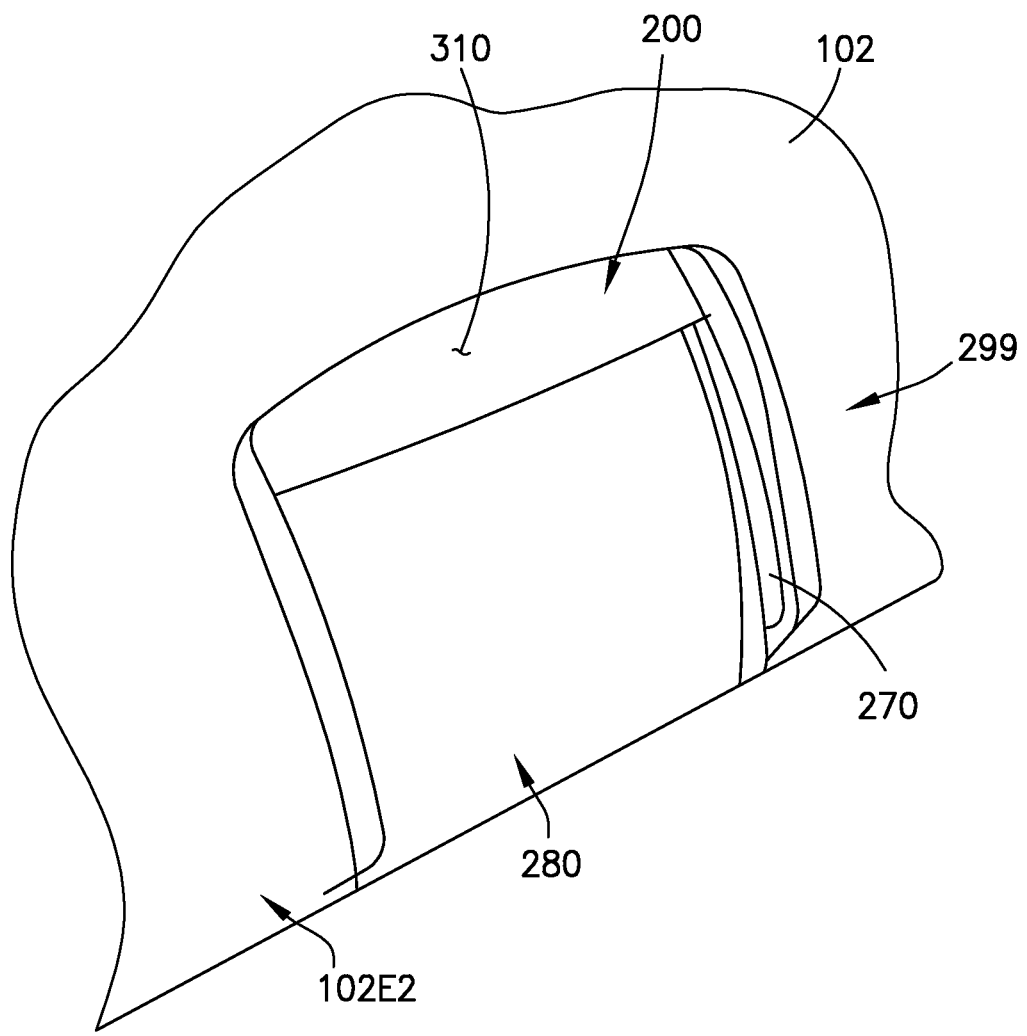
Figure 2C:
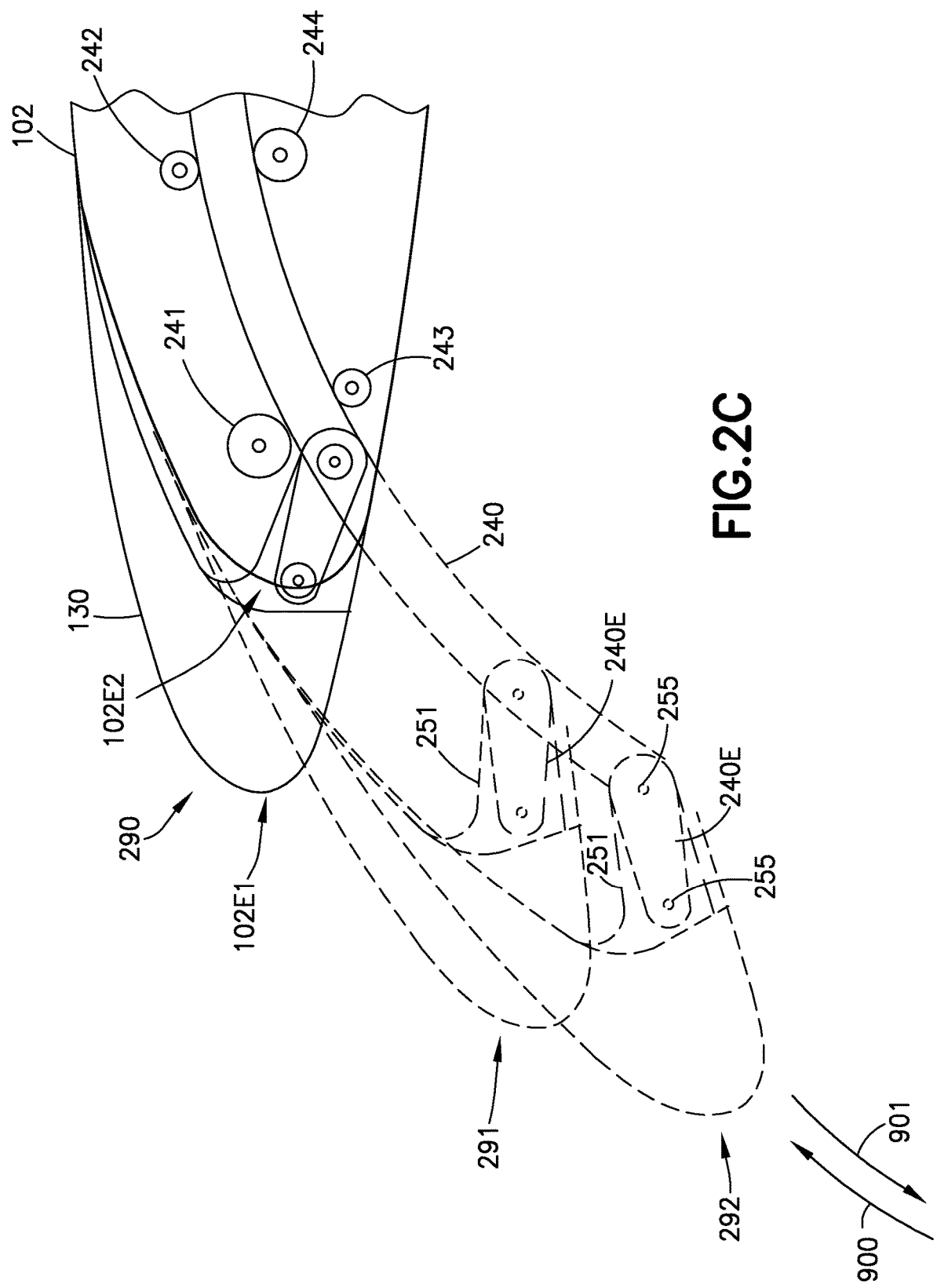
Figure 3B:
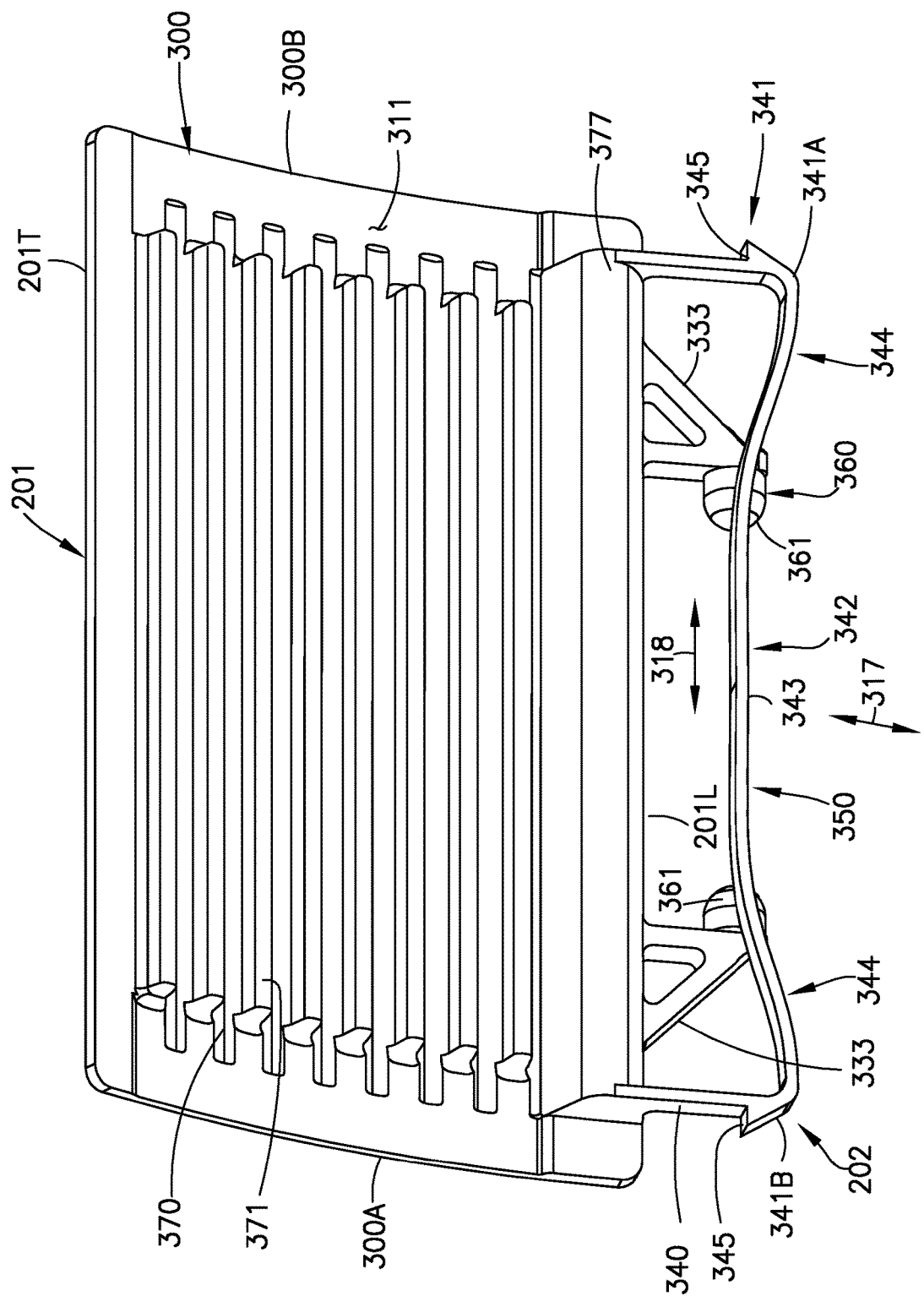
Figure 3C:
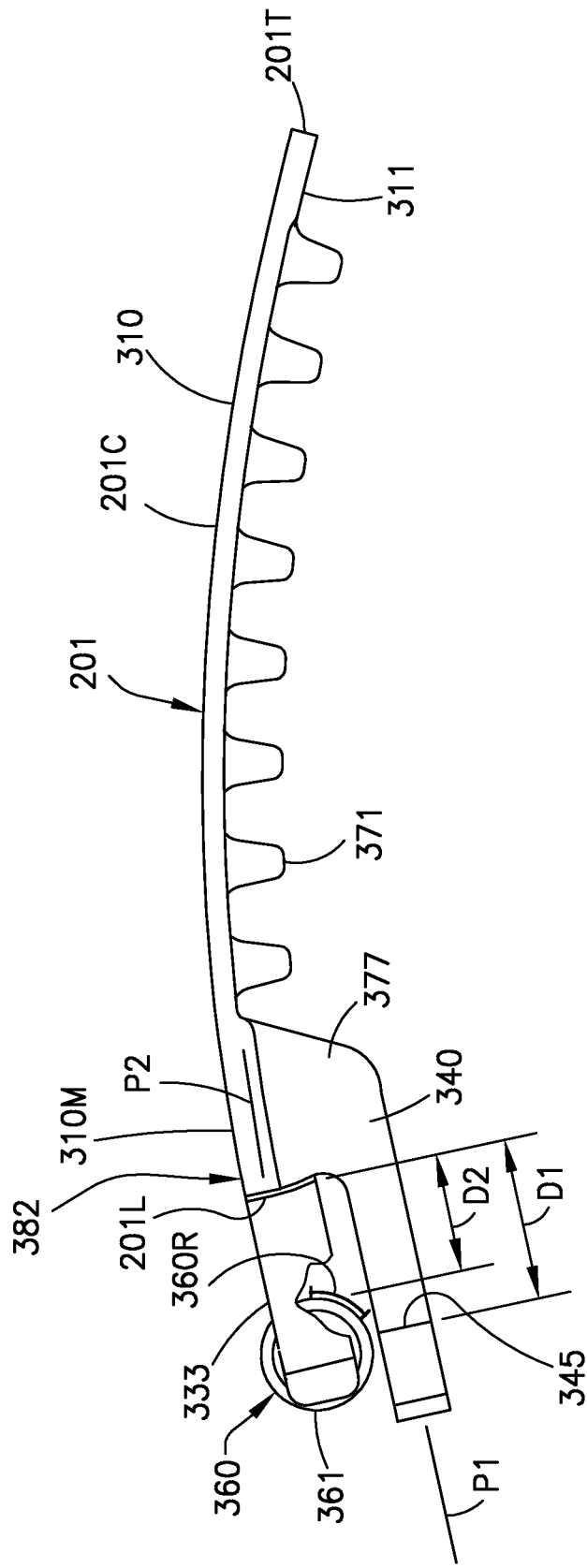
Figure 4A:
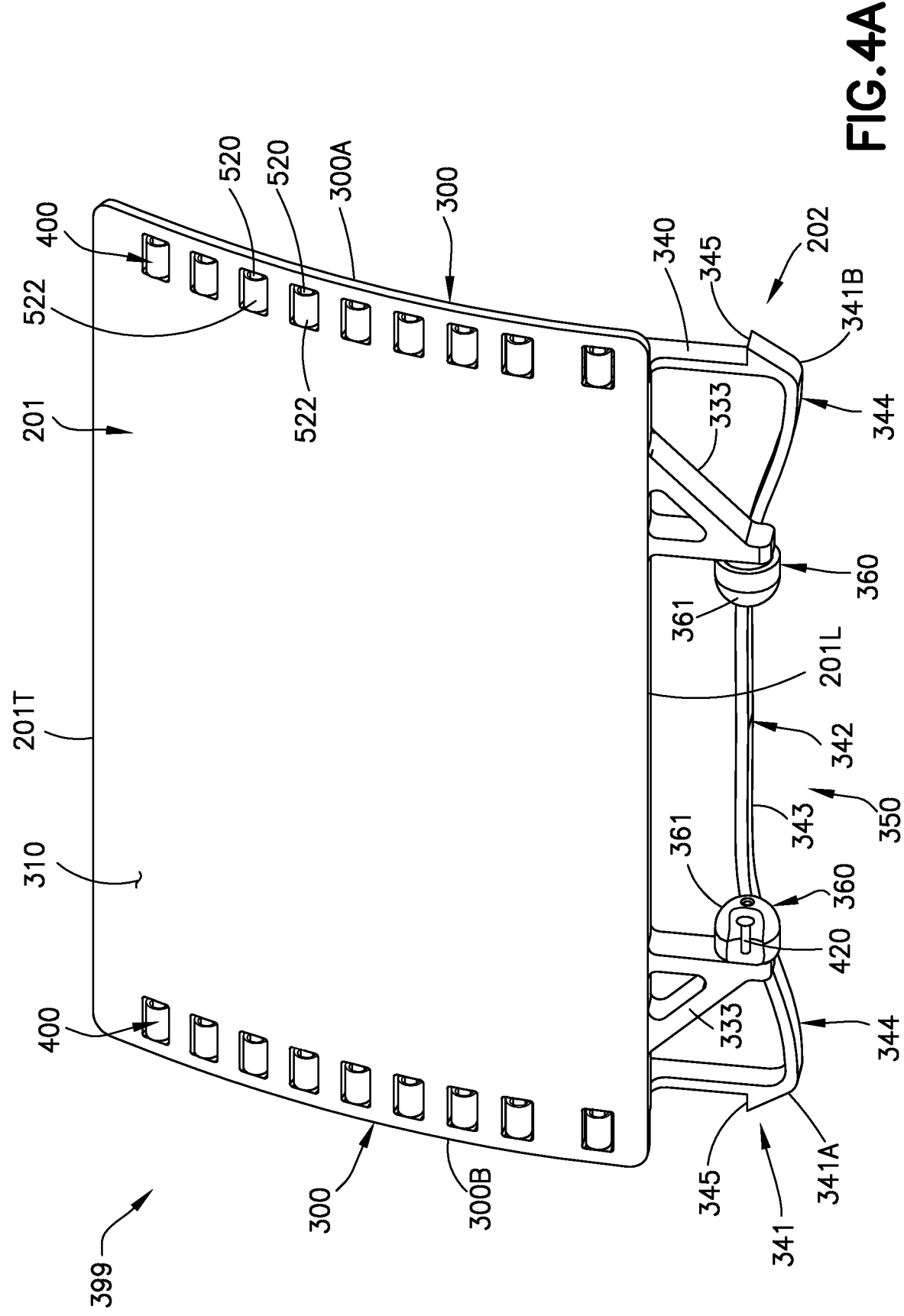
Figure 4C:
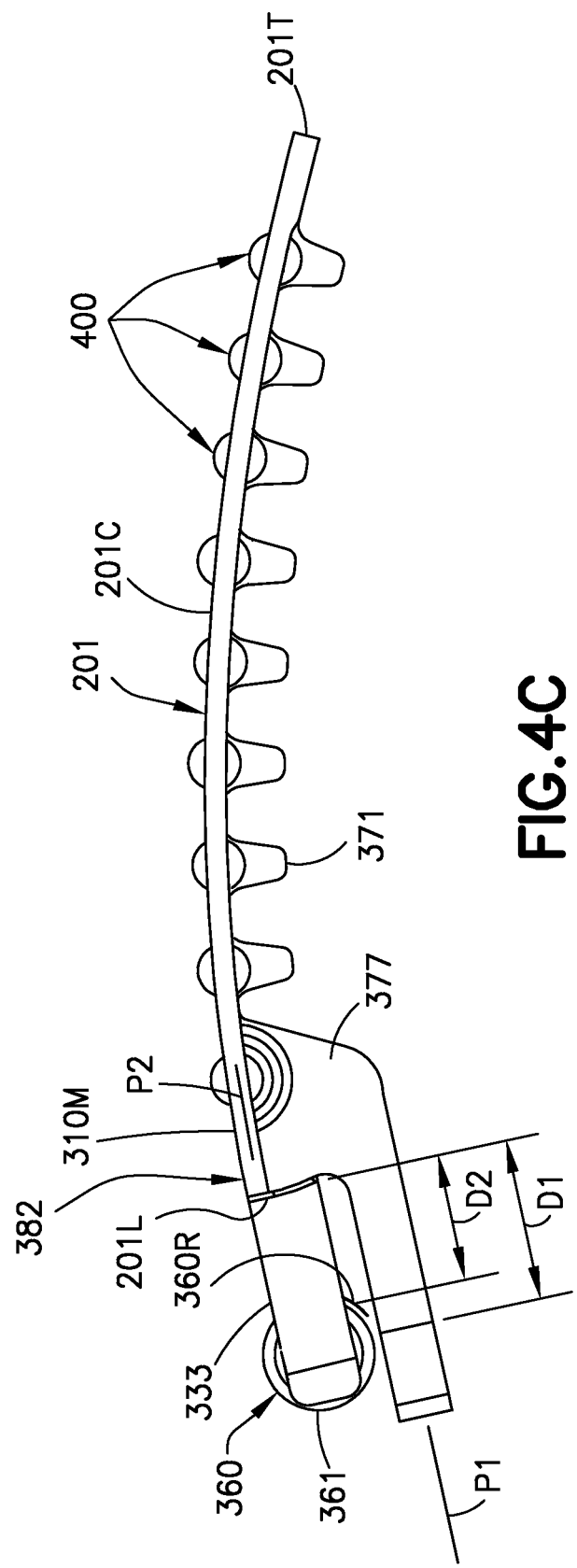
Figure 5A:
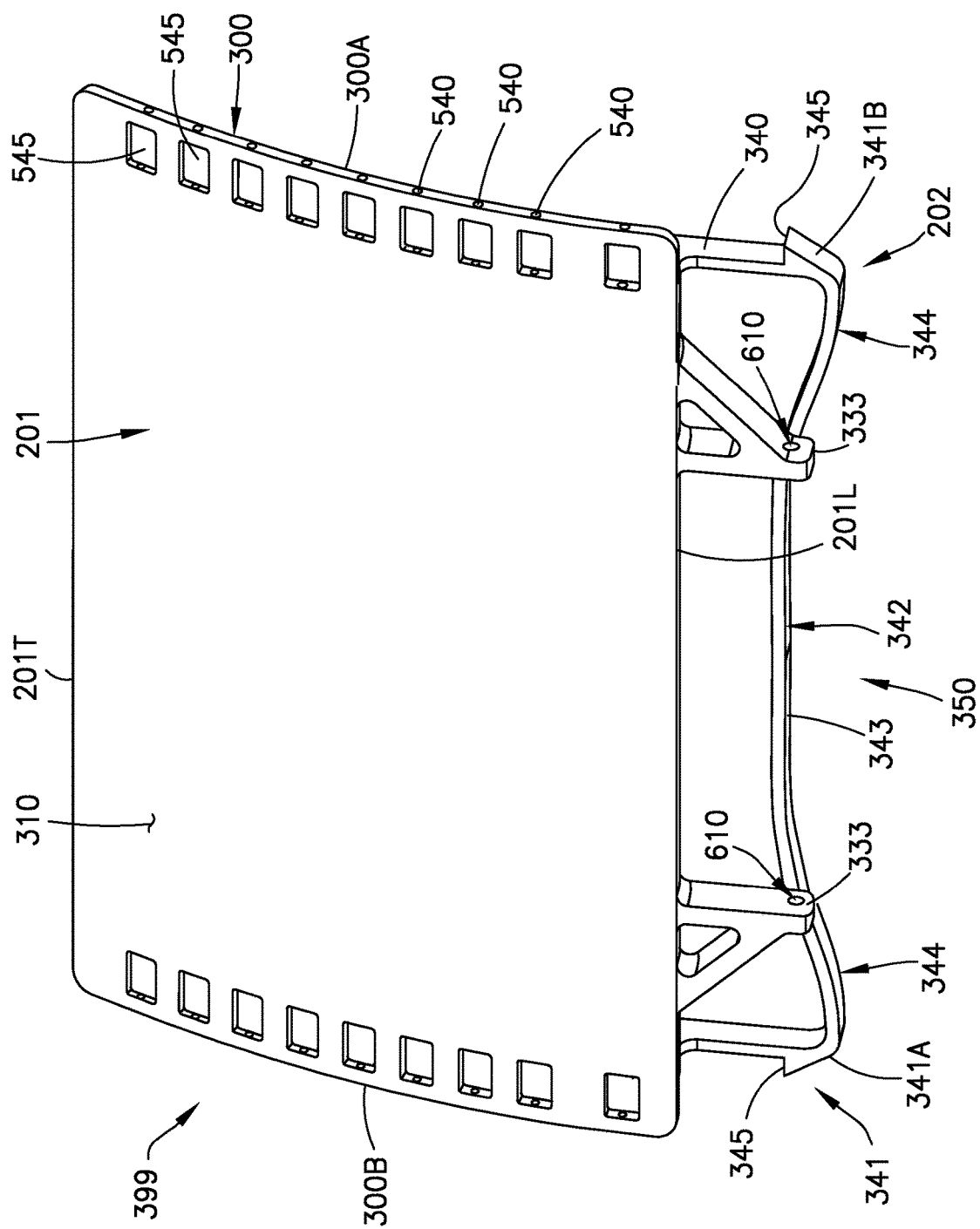
Figure 5B:
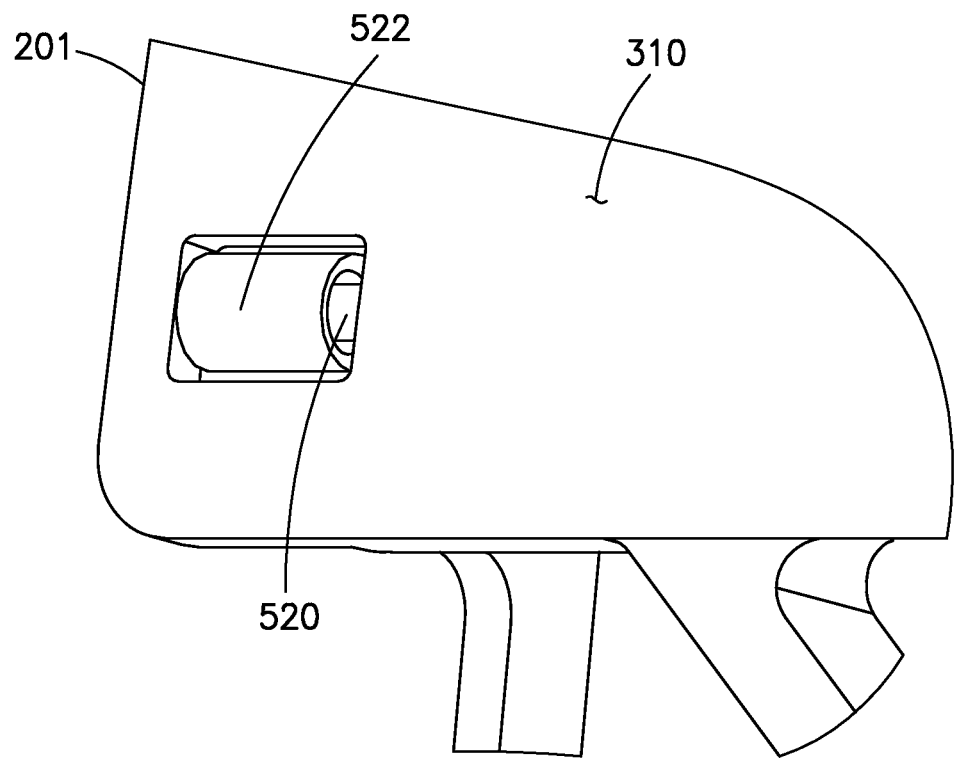
Figure 5C:
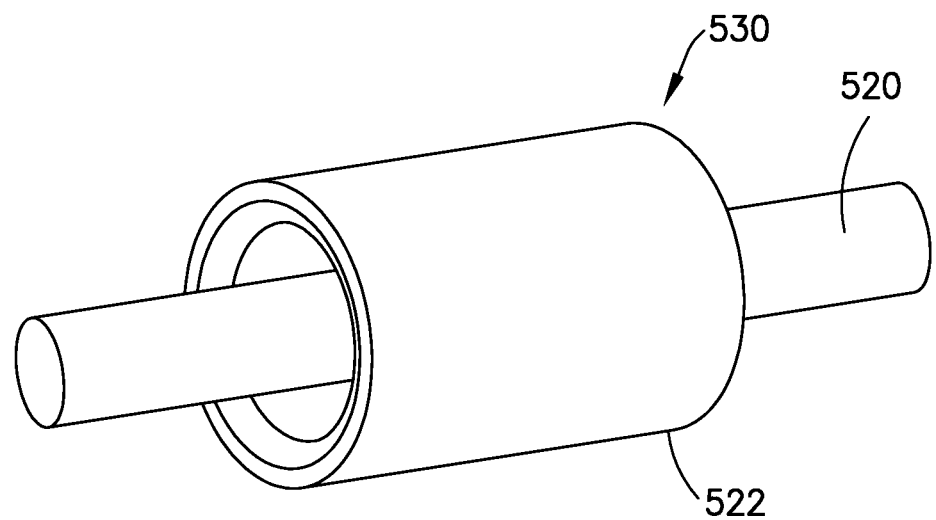
Figure 6A:
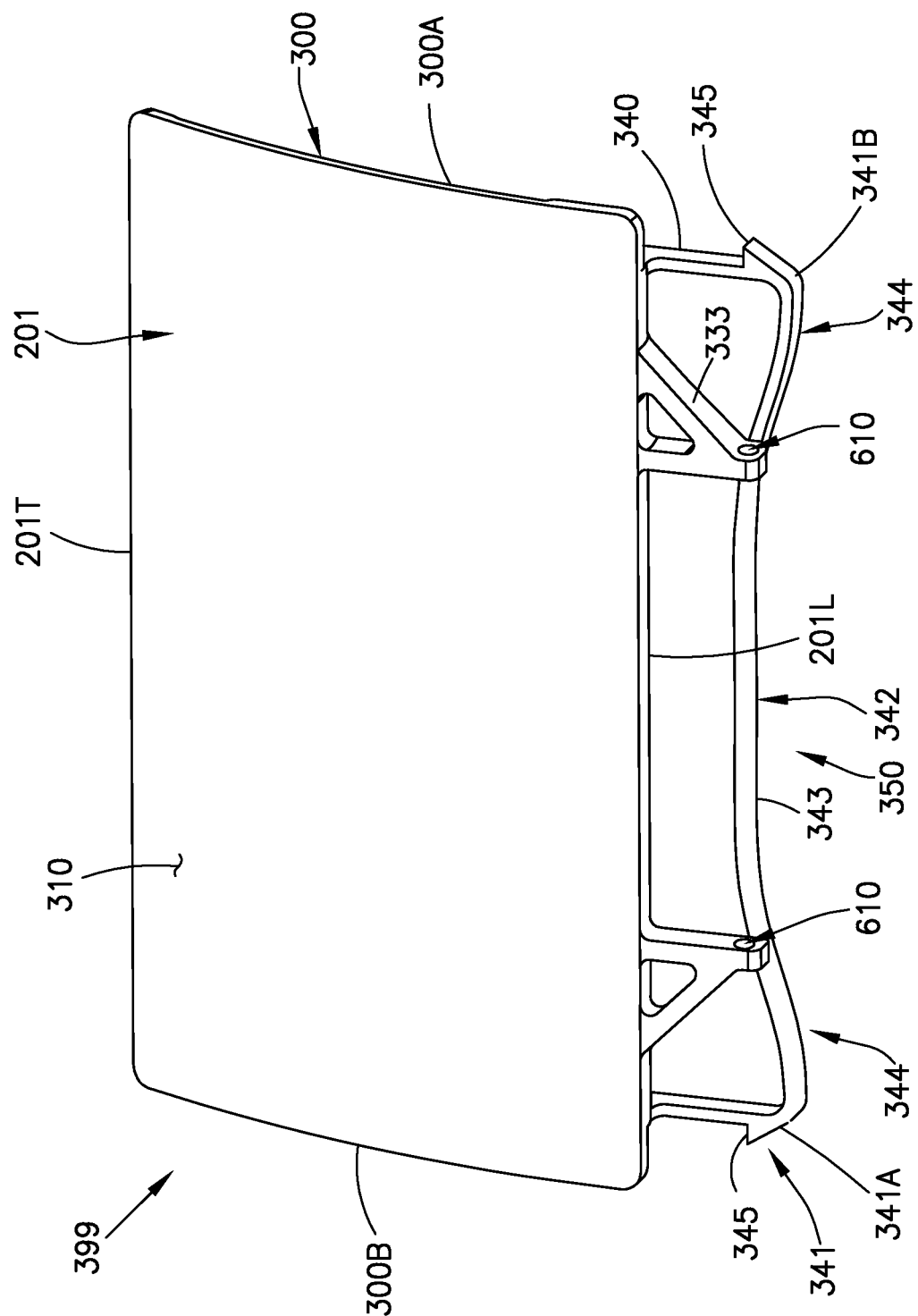
Figure 6B:
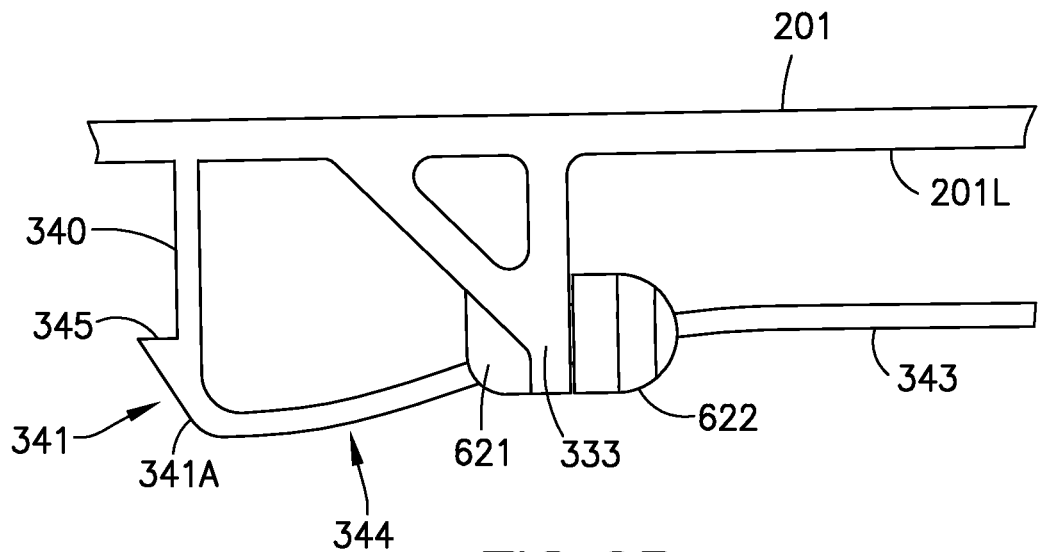
Figure 6C:
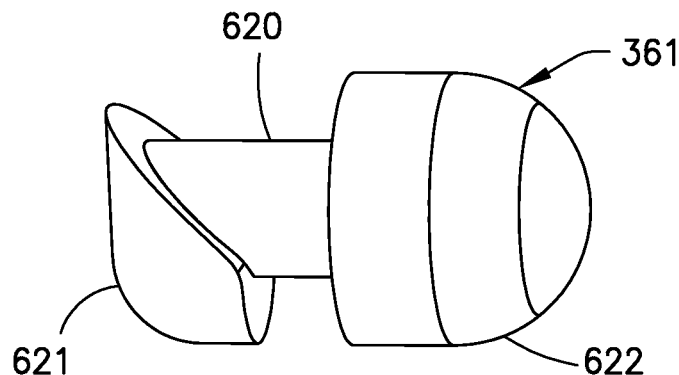
Figure 6D:
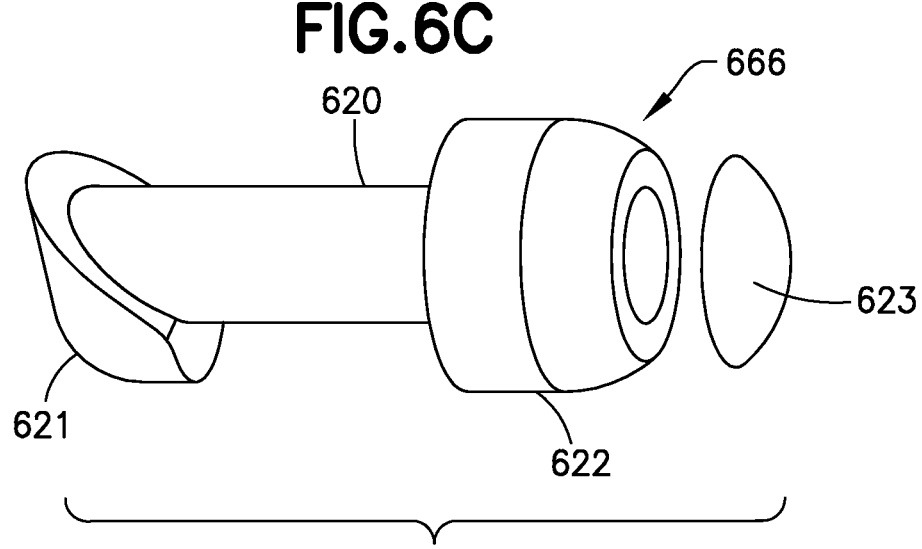
Figure 7:
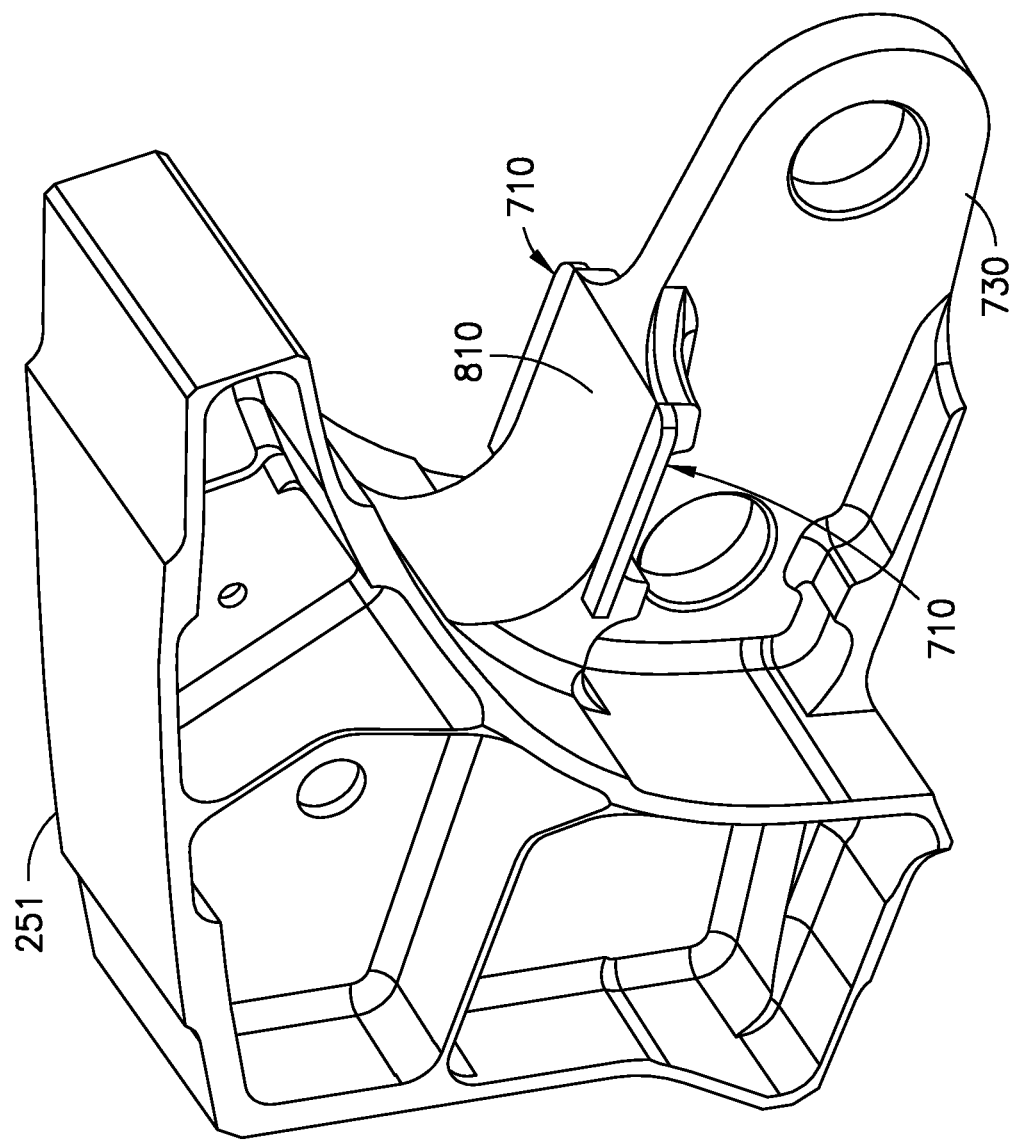
Figure 8:
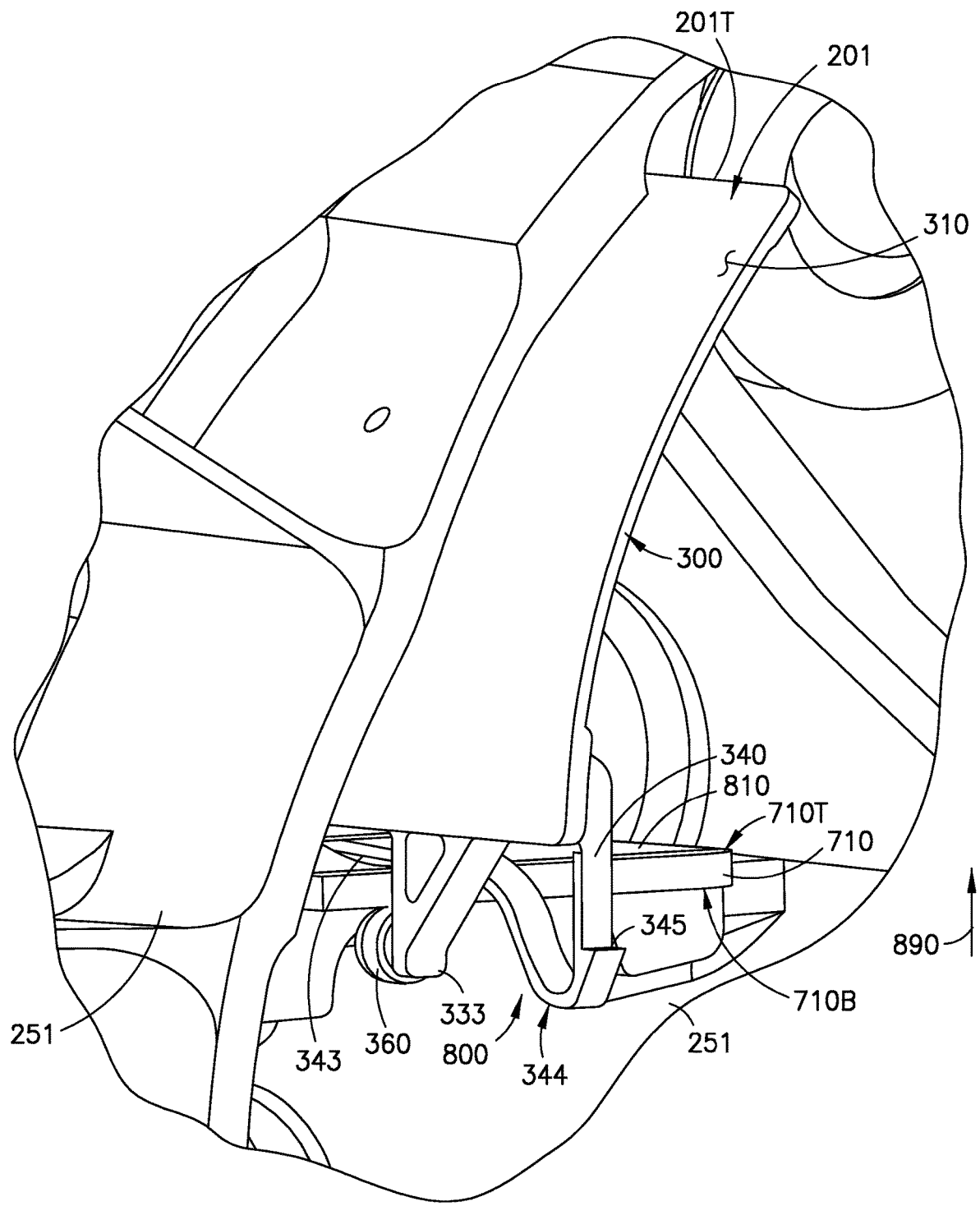
Figure 9B:
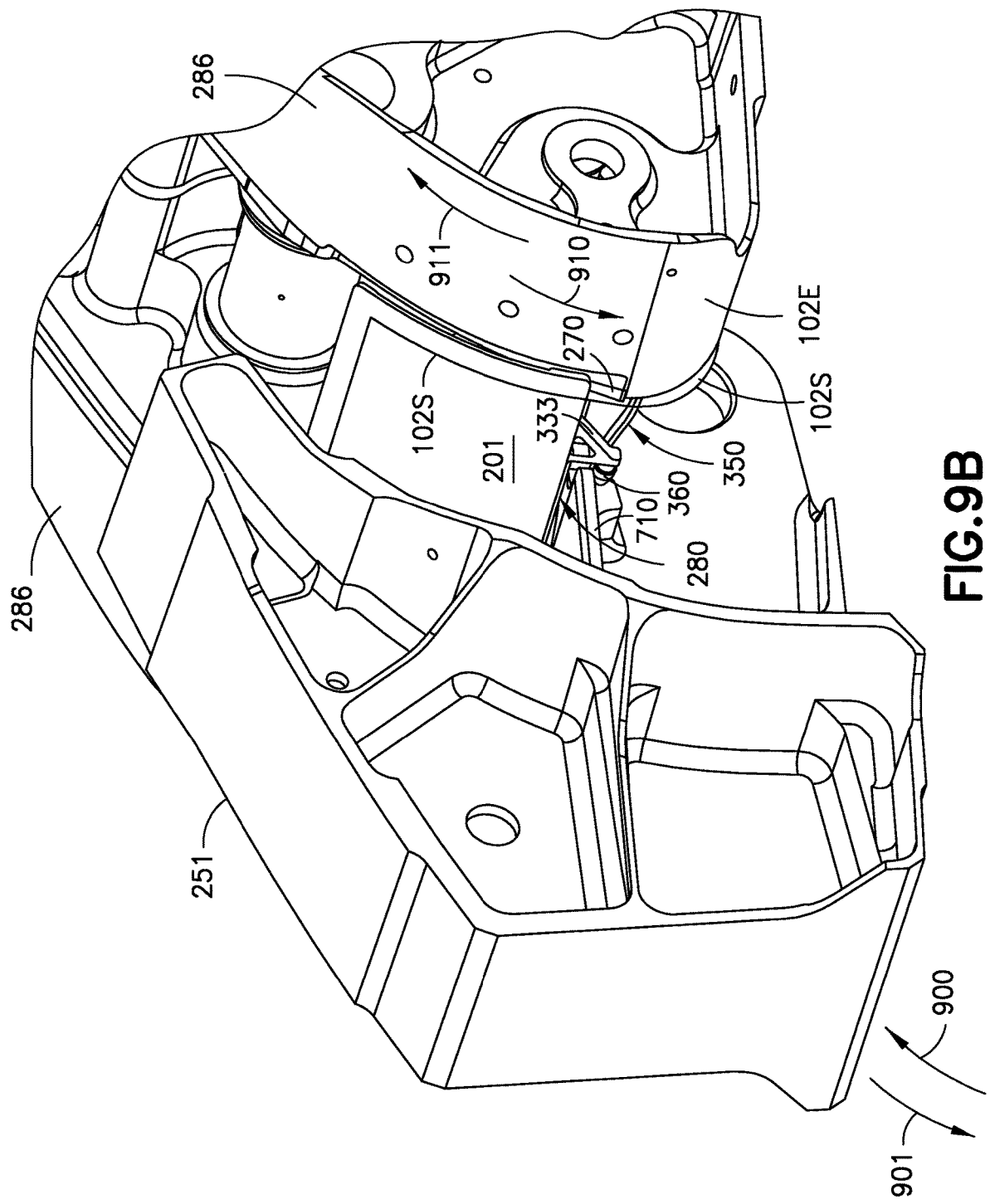
Figure 10A:
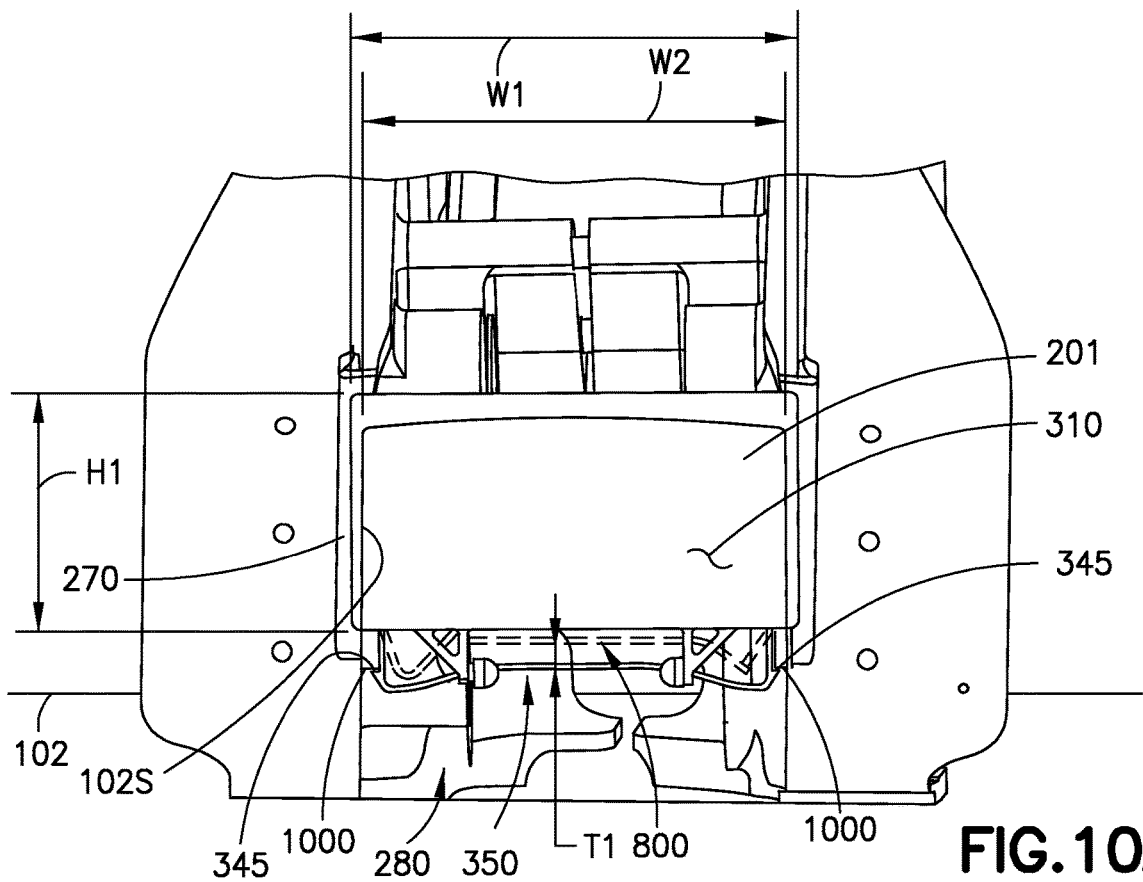
Figure 10B:
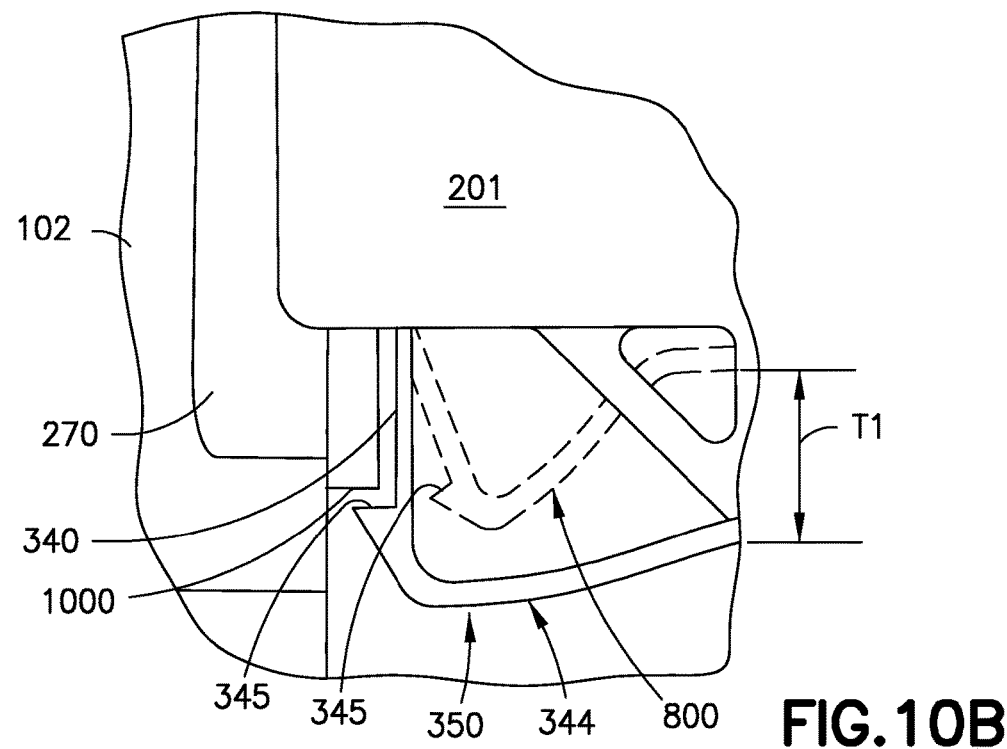
Figure 11:
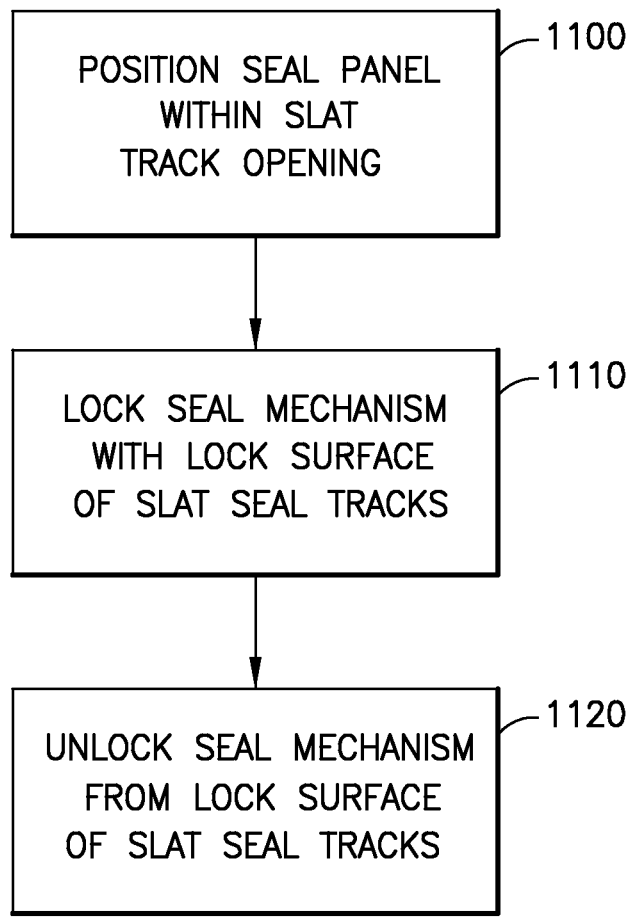
Figure 12A:
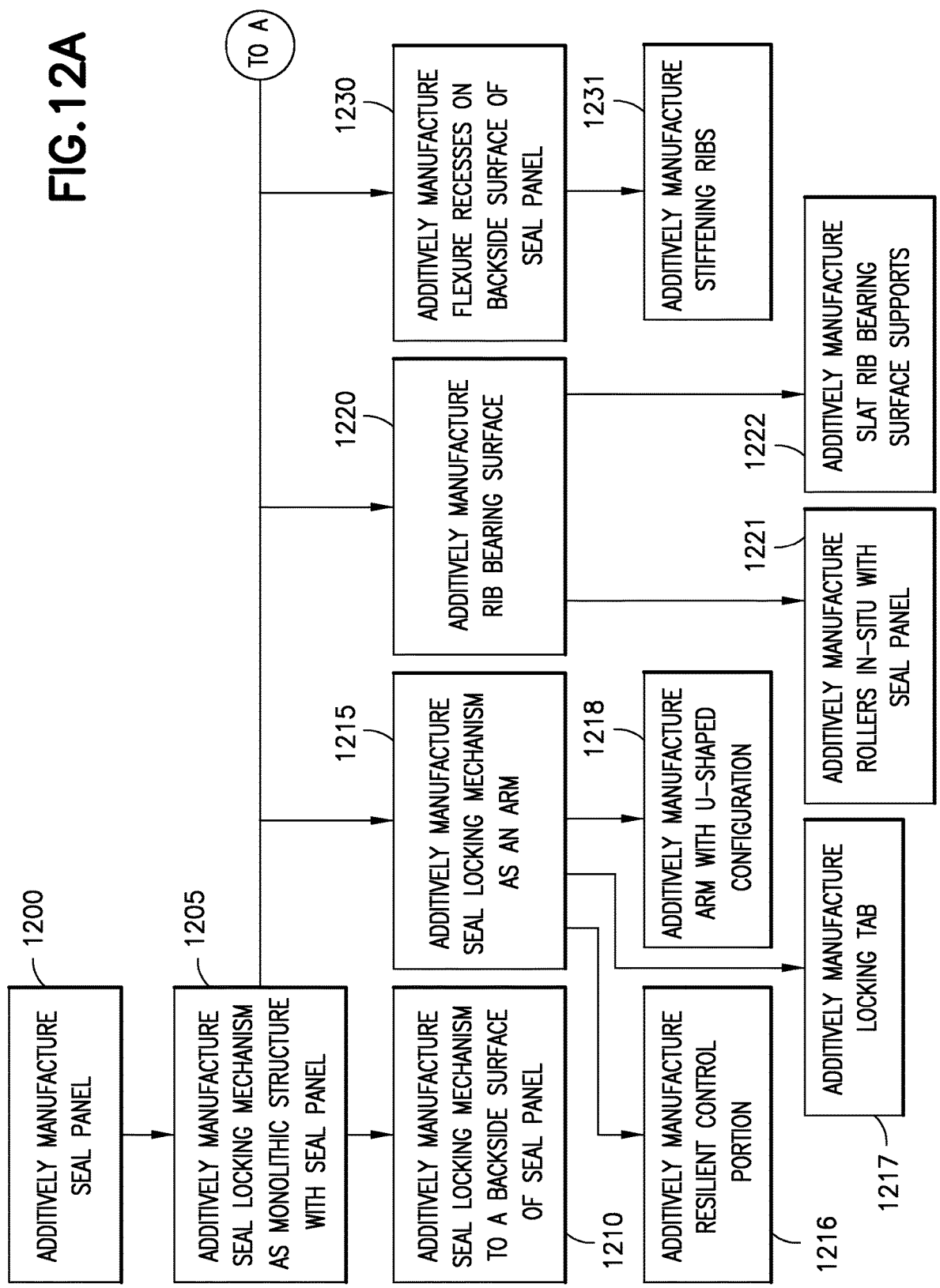

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic perspective illustration of an aircraft in accordance with aspects of the present disclosure;

FIG. 2A is a schematic cross-sectional illustration of a portion of a wing of the aircraft of FIG. 1 in accordance with aspects of the present disclosure;

FIG. 2B is a schematic perspective illustration of a portion of the wing of the aircraft of FIG. 1 in accordance with aspects of the present disclosure;

FIG. 2C is a schematic cross-sectional illustration of a portion of a wing (e.g., a wing slat) of the aircraft of FIG. 1 in different positions in accordance with aspects of the present disclosure;

FIG. 3A a is a schematic front perspective illustration of a portion of seal of the aircraft of FIG. 1 in accordance with aspects of the present disclosure;

FIG. 3B is a schematic rear perspective illustration of the portion of the seal of FIG. 3A in accordance with aspects of the present disclosure;

FIG. 3C is a schematic side illustration of the portion of the seal of FIG. 3A in accordance with aspects of the present disclosure;

FIG. 4A a is a schematic front perspective illustration of a portion of seal of the aircraft of FIG. 1 in accordance with aspects of the present disclosure;

FIG. 4B is a schematic rear perspective illustration of the portion of the seal of FIG. 4A in accordance with aspects of the present disclosure;

FIG. 4C is a schematic side illustration of the portion of the seal of FIG. 4A in accordance with aspects of the present disclosure;

FIG. 5A is a schematic perspective illustration of a portion of the seal of FIG. 4A in accordance with aspects of the present disclosure;

FIG. 5B is a schematic perspective illustration of a portion of the seal of FIG. 4A in accordance with aspects of the present disclosure;

FIG. 5C is a schematic perspective illustration of a portion of the seal of FIG. 4A in accordance with aspects of the present disclosure;

FIG. 6A is a schematic perspective illustration of a portion of the seal of either FIG. 3A or FIG. 4A in accordance with aspects of the present disclosure;

FIG. 6B is a schematic top illustration of a portion of the seal of either FIG. 3A or FIG. 4A in accordance with aspects of the present disclosure;

FIG. 6C is a schematic perspective illustration of a portion of the seal of either FIG. 3A or FIG. 4A in accordance with aspects of the present disclosure;

FIG. 6D is a schematic perspective illustration of a portion of the seal of either FIG. 3A or FIG. 4A in accordance with aspects of the present disclosure;

FIG. 7 is a schematic perspective illustration of a portion of a wing of the aircraft of FIG. 1 in accordance with aspects of the present disclosure;

FIG. 8 is a schematic perspective illustration of a portion of a wing of the aircraft of FIG. 1 in accordance with aspects of the present disclosure;

FIG. 9A is a schematic perspective illustration of a portion of a wing of the aircraft of FIG. 1 in accordance with aspects of the present disclosure, noting that the slat rib is illustrated as being transparent for explanatory purposes;

FIG. 9B is a schematic perspective illustration of a portion of a wing of the aircraft of FIG. 1 in accordance with aspects of the present disclosure, noting that the slat rib is illustrated as being transparent for explanatory purposes;

FIG. 10A is a schematic perspective illustration of a portion of a wing of the aircraft of FIG. 1 in accordance with aspects of the present disclosure;

FIG. 10B is a schematic perspective illustration of a portion of a wing of the aircraft of FIG. 1 in accordance with aspects of the present disclosure;

FIG. 11 is flow diagram for an exemplary method in accordance with aspects of the present disclosure; and FIGS. 12A and 12B are a flow diagram for an exemplary method in accordance with aspects of the present disclosure.

DETAILED DESCRIPTION

Referring to FIG. 1, an exemplary aircraft 100 is illustrated and incorporates aspects of the present disclosure. The aircraft includes a fuselage 104 and an empennage 106. The empennage 106 includes a pair of horizontal stabilizers 108R, 108L and a vertical stabilizer 110. Wings 102R, 102L (each wing being generally referred to herein as "wing 102") extend from the fuselage 104. One or more engines 112R, 112L may be supported by wings 102R, 102L. The wings 102R, 102L include slats 131-144 that are disposed along leading edges 102E of the respective wing 102R, 102L. The slats 131-144 are extended to improve low speed flight of the aircraft 100 and provide for aircraft 100 operation at higher angles of attack. While the aircraft 100 is illustrated in FIG. 1 as a commercial jet, the aspects of the present disclosure apply equally to any other suitable aircraft that employs slats.

Referring to FIGS. 1, 2A and 2B, the slats 131-144, which are generically represented in FIG. 2A as slat 130, each include at least slat rib 251 that couples the slat 130 to the wing 102. For example, the slat rib 251 is coupled to a slat track 240 that is movably supported within the wing 102 by rollers 241-244. The rollers 241-244 may be coupled to at least one wing rib 286. The slat track 240 includes a gear rack 245 that is driven by pinion 246 for extending and retracting the slat 130 relative to the wing 102. FIG. 2C illustrates the slat 130 in a retracted position 290 so that the slat forms a first portion 102E1 of the leading edge 102E of the wing 102; in a partially extended position 291; and an extended position 292. With the slat 130 in the partially extended position 291 and/or in the extended position 292, a second portion 102E2 of the leading edge 102E of the wing 102 is exposed to airflow around the wing 102. The slat track 240 protrudes through a slat track opening 280 of the wing 102, where the slat track opening 280 is sealed by a seal 200. The seal 200 is an aero-restoration seal that is configured to restore the aerodynamic properties of the wing 102 so that the slat track opening 280 may not entrain airflow and reduce aerodynamic performance of the wing 102. In accordance with aspects of the present disclosure the seal 200 may have a monolithic construction and be actuated only under impetus (e.g., both deployed and retracted) of the slat rib 251. The seal 200 has a reduced part count, compared to spring driven/deployed aero-restoration seals, which provides for a less expensive lighter seal. Accordingly, the seal 200 of the present disclosure may reduce the cost of the aircraft 100 and improve fuel economy of the aircraft 100.

Still referring to FIGS. 2A, 2B, and 2C, for purposes of illustrating the interaction between seal 200 of the present disclosure, an exemplary aircraft 100 slat system will be described in accordance with the aspects of the present disclosure. Generally, the aircraft 100 slat system includes the slat track 240 that is moveably supported in the wing 102 for longitudinal movement toward and away from the second portion 102E2 of the leading edge 102E of the wing 102. The slat track 240 has a forward end 240E that is coupled to the slat rib 251 for conjoint movement therewith.

In the particular example shown, the forward end 240E of the slat track 240 is coupled to the slat rib 251 by a plurality of fasteners 255, such as bolts, that extend through both the slat track 240 and a rearwardly extending tongue 730 (FIG. 7) on the slat rib 251, although other coupling mechanisms can be used instead or in place of the bolts and tongue 730 (FIG. 7). The slat track 240 can include a rear end 258 that extends rearwardly into the wing 102 and can, for example be enclosed within a housing 259 to isolate the slat track 240 from the contents of, for example, a fuel tank or other structure disposed within the wing 102. The slat track 240 is upwardly arched such that the slat track 240 moves forward and downward relative to the second portion 102E2 of the leading edge 102E of the wing 102 upon extension, and rearward and upward relative to the second portion 102E2 of the leading edge 102E upon retraction. A slat track actuator 246A is configured to selectably drive the slat track 240 (e.g., through rotation of pinion 246) between the retracted position 290 and the extended position 292 relative to the second portion 102E2 of the leading edge 102E of the wing 102. As will be described in greater detail below, movement of the slat rib 251 alone drives movement of the seal 200 for sealing the slat track opening 280.

Referring to FIGS. 3A-3C, the seal 200 comprises a seal panel 201 and a seal locking mechanism 202. The seal locking mechanism 202 is coupled to the seal panel 201. The seal locking mechanism 202 is configured to resiliently move, only under impetus of an actuator 250 (FIG. 2A), between an unbowed position 350 and a bowed position 800 (FIG. 8). The seal panel 201 comprises lateral sides 300 (which include a first lateral side 300A, and a second lateral side 300B), a leading edge 201L, and a trailing edge 201T. The seal panel 201 also comprises an aero-restoration surface 310 extending between the leading edge 201L and the trailing edge 201T. The seal panel further comprises a backside surface 311 extending between the leading edge 201L and the trailing edge 201T opposite the aero-restoration surface 310. The seal panel 201 comprises flexure recesses 370 configured to effect fore-aft flexure of the seal panel 201 such that the seal panel 201 conforms to a wing contour 299 of the wing 102. The seal panel 201 also comprises stiffening ribs 371 where the flexure recesses 370 extend between adjacent stiffening ribs 371. The stiffening ribs 371 counter any aerodynamic loads exerted on the seal panel 201 when the seal panel is deployed within the slat track opening 280 (FIG. 2B).

The lateral sides 300 of the seal panel 201 are configured to engage slat seal tracks 270 (FIG. 2B) of a wing 102 of an aircraft 100 (FIGS. 1 and 2B) for guiding movement of the seal panel 201 between deployed and retracted positions. The seal panel 201 may be retained within the slat seal track 270 by a skin 102S of the wing 102 where the skin 102S, at least in part, forms the slat track opening 280. For example, referring also to FIG. 10A, the seal panel 201 may have a width W1 of about 5 inches (about 127 mm) and a height H1 of about 3 inches (about 76 mm) to about 5 inches (about 127 mm). In other aspects, the width W1 may be more or less than about 5 inches (about 127 mm) and the height H1 may be more than about 5 inches (about 127 mm) or less than about 3 inches (about 76 mm). The width W2 of the slat track opening 280 may be less than the width W1 of the seal panel 201 so that the skin 102S forms at least one side of the slat seal track 270 and at least another side of the slat seal track 270 is formed by at least one wing rib 286 that supports the slat track 240. In other aspects, the slat seal track may have any suitable configuration.

In one aspect, the seal locking mechanism 202 is unitarily coupled to the backside surface 311 adjacent the leading edge 201L; while in other aspects, the seal locking mechanism 202 may be coupled to seal panel 201 in any suitable manner. In the aspect, illustrated in FIGS. 3A-3C the seal panel 201 and the seal locking mechanism 202 form a monolithic structure 399. The seal panel 201 and seal locking mechanism 202 each comprise a polymer (e.g., polyether ether ketone, nylon, acetal (Polyoxymethylene POM), or any other suitable polymer or composite) and are fused together through additive manufacturing of the seal 200. In other aspects the seal panel 201 and seal locking mechanism 202 may comprise any suitable resilient material (e.g., metal, polymer, composite, etc.) that provides a predetermined range of travel T1 (FIGS. 10A and 10B) of the seal locking mechanism 202 for engaging and disengaging the seal locking mechanism 202. In still other aspects, the material of the seal panel 201 may be different than the material of the seal locking mechanism 202.

The seal locking mechanism 202 comprises an arm 340 cantilevered from the seal panel 201. The seal locking mechanism 202 is cantilevered from the seal panel 201 so as to extend from the seal panel 201 along a plane P1 (FIG. 3C) substantially parallel to another plane P2 (FIG. 3C) defined by a major surface 310M of the seal panel 201. For example, the seal panel 201 may include at least a portion 382 that is substantially straight so as to define the plane P2 and the arm 340 extends from the seal panel 201 in plane P1 which is substantially parallel to plane P2. It is noted that when uninstalled from the aircraft the seal panel 201 may be substantially straight so as to define plane P1 such that a contour of the seal panel 201 may change upon installation into the aircraft 100 so that the seal panel conforms to a contour of the wing 102 and/or the slat seal track 270. The seal locking mechanism 202 is coupled to the seal panel by at least one stanchion 377.

The arm 340 has a pair of flexible locking members 341, and a resilient control portion 342 extending between the flexible locking members 341. Flexure of the resilient control portion 342 effects relative movement of the pair of flexible locking members 341 towards each other and away from each other for engaging the seal locking mechanism 202 with the slat seal tracks 270 (FIG. 2B) and disengaging the seal locking mechanism 202 from the slat seal tracks 270 (FIG. 2B) as described herein. The resilient control portion 342 comprises a substantially straight central portion 343 and forward extending bowed portions 344. The forward extending bowed portions extend from opposite ends of the substantially straight central portion 343 so as to couple the substantially straight central portion 343 to the pair of flexible locking members 341. In one aspect, the arm 340 has a U-shaped configuration (see FIGS. 3A and 3B) so that movement of the straight central portion 343 (which forms the base of the U-shaped configuration) in direction 317 causes each flexible locking member 341A, 341B (which form legs of the U-shaped configuration) of the flexible locking members 341 to move in direction 318 towards and away from each other. In other aspects, the arm 340 may have any suitable shape/configuration that causes engaging and disengaging the seal locking mechanism 202 from the slat seal tracks 270 (FIG. 2B). Each flexible locking member 341A, 341B of the pair of flexible locking members 341 includes a locking tab 345 configured to engage a respective lock surface 1000 (FIG. 10) of the slat seal tracks 270 where movement of the flexible locking members 341 towards each other to a bowed position 800 (FIG. 8) disengages the seal locking mechanism 202 from the slat seal tracks 270 (FIG. 2B) and movement of the flexible locking members 341 away from each other to an unbowed position 350 engages the seal locking mechanism 202 with the slat seal tracks 270 (FIG. 2B).

Referring to FIGS. 10A and 10B, the unbowed position 350 is configured to engage the seal locking mechanism 202. The unbowed position 350 engages the seal locking mechanism 202 with a lock surface 1000 of the slat seal tracks 270. For example, in the unbowed position the locking tabs 345 substantially engage the lock surface 1000 of the slat seal tracks 270 for substantially preventing retraction of the seal panel 201 from the slat track opening 280. The bowed position 800 (shown in dashed lines in FIGS. 10A and 10B) is configured to disengage the seal locking mechanism 202. The bowed position 800 disengages the seal locking mechanism 202 from the lock surface 1000 of the slat seal tracks 270. For example, in the bowed position the locking tabs 345 are pulled towards each other to move the locking tab 345 away from (e.g., disengage the locking tab 345 from) the lock surface 1000 of the slat seal tracks 270 for allowing retraction of the seal panel 201 from the slat track opening 280. The seal locking mechanism 202 may provide the substantially straight central portion 343 with a predetermined range of travel T1 for transitioning between the bowed position 800 and the unbowed position 350. In one aspect, the predetermined range of travel T1 may be about 0.40 inches (about 10 mm) while in other aspects the predetermined range of travel may be more or less than about 0.40 inches (about 10 mm).

Referring again to FIGS. 3A-3C, the actuator 250 is the slat rib 251 of the wing 102 and the seal 200 further comprises slat rib bearing surfaces 360 cantilevered from the seal panel 201. The slat rib bearing surfaces 360 are coupled to the seal panel 201 by integrally formed slat rib bearing surface supports 333 that are cantilevered from the seal panel 201. In one aspect, the slat rib bearing surface supports 333 extend from the leading edge 201L of the seal panel 201 so as to be disposed within the plane P1 of the seal panel 201. In other aspects, the slat rib bearing surface supports 333 may extend from the seal panel so as to offset from the plane P1. The slat rib bearing surfaces 360 comprise rollers 361, or any other suitable bearing structure, configured to engage slat rib extension rails 710 of the slat rib 251 (see FIGS. 7 and 8). In one aspect, each of the rollers 361 is additively manufactured in-situ with the seal panel 201. For example, selective laser sintering (SLS) or other suitable additive manufacturing process may be employed to "print" the seal 200 (inclusive of the rollers 361) so that a running clearance is provided between each of the rollers 361 and the respective axle 420 (FIG. 4A) as the seal panel 201, seal locking mechanism 202, and rollers 361 are additively manufactured and are assembled by virtue of the additive manufacturing process. In this aspect, the rollers 361 may be formed of the same material as the seal panel 201 and the seal locking mechanism 202.

In other aspects, the each of the rollers 361 comprises a material that is different than a material of the seal panel 201. For example, the seal panel 201 may be constructed of a polymer while the rollers 361 are constructed of a metal such as aluminum, titanium, steel, etc. In this aspect, the rollers 361 may be provided as inserts to the additive manufacturing process where the seal panel 201 is additively formed around the rollers 361. The term insert as used herein refers to an item that is placed on or suspended above the build table/platform of the additive manufacturing process so that the additively manufactured part may be built around, so as to integrate, the insert into the additively manufactured part. For example, referring also to FIG. 6C, the rollers 361 include an axle 620, a retainer 621, and a bearing 622 such that the seal panel 201 is additively manufactured around the axle 620 and extends between the retainer 621 and the bearing so that the roller 361 is retained on the seal panel 201 (e.g., such as retained on the slat rib bearing surface supports 333—see FIG. 6B). In still other aspects, referring also to FIGS. 6A and 6D the seal panel 201 may be formed with apertures 610 and the rollers 361 may be provided as a kit of parts that form a roller assembly 666. Here the axle 620 is inserted through a respective aperture 610 and the bearing 622 is coupled to the axle 620 in any suitable manner, such as by an axle cap 623, and the roller is captured on the seal panel 201 by the retainer 621 and the bearing 622 being disposed on opposite sides of the slat rib bearing surface supports 333 in a manner substantially similar to that shown in FIG. 6B.

The slat rib bearing surfaces 360 are cantilevered from a leading edge 201L of the seal panel 201 by the slat rib bearing surface supports 333. A distance D1 between a locking tab 345 of the seal locking mechanism 202 and a leading edge 201L of the seal panel 201 is greater than another distance D2 between the an engagement region 360R of the slat rib bearing surfaces 360 and the leading edge 201L of the seal panel 201. The distance D1 being greater than the distance D2 provides for a sequential engagement and disengagement between the rollers 361 and the slat rib extension rails 710 (FIG. 7) and between the seal locking mechanism 202 and the slat seal track 270 (FIG. 2B). For example, referring also to FIGS. 2C, 8, 9A, and 9B, when the slat 130 is in the retracted position 290 (FIG. 2C) a seal engagement portion 810 of the of the slat rib 251 is engaged with, at least, the substantially straight central portion 343 of the resilient control portion 342 of the seal locking mechanism 202. When in the slat 130 is in the retracted position 290 the seal engagement portion 810 holds the seal locking mechanism in the bowed position 800 so that the pair of flexible locking members 341 are pulled away from the slat seal tracks 270. In one aspect, the seal engagement portion 810 of the slat rib 251 comprises the slat rib extension rails 710; while in other aspects any suitable removable contact pad may be coupled to the slat rib for engaging the substantially straight central portion 343.

As seen best in FIG. 8, the substantially straight central portion 343 engages the slat rib 251 on or adjacent to (such as where the removable contact pad is used) a top 710T of the slat rib extension rails 710 while the slat rib bearing surfaces 360 engage a bottom 710B of the slat rib extension rails 710. Here substantial contact between the slat rib bearing surfaces 360 and the bottom 710B of the slat rib extension rails 710 provides reactive forces against a bias force of the seal locking mechanism 202 so that the seal 200 is captured on the slat rib 251 for conjoint movement with the slat rib 251. Capturing the seal 200 on the slat rib 251, so that the slat rib extension rails 710 are disposed between the slat rib bearing surfaces 360 and the resilient control portion 342, provides for retracting movement of the slat rib 251 in direction 900 causing the slat rib 251 to push the resilient control portion 342 in direction 890 (FIG. 8). Pushing the resilient control portion 342 in direction 890 causes the seal locking mechanism 202 to move to the bowed position 800. With the slat 130 in the retracted position the slat rib bearing surfaces 360 are disposed towards a front of the slat rib extension rails 710.

As the slat rib 251 is extended in direction 901, the seal 200 is constrained within the slat seal tracks 270 such that the slat rib extension rails pull the seal 200 downward in direction 910 along the slat seal tracks 270. The relative movement between the seal 200 and the slat rib 251 as the seal 200 moves downward and the slat rib 251 moves in direction 901 causes the slat rib bearing surfaces 360 to move rearward (see FIG. 9B) and off of the slat rib extension rails 710. Movement of the slat rib bearing surfaces 360 off of the slat rib extension rails 710 releases the resilient control portion 342 from the slat rib 251 causing the seal locking mechanism 202 to move into the unbowed position 350 so that the seal locking mechanism 202 engages the slat seal tracks 270. The distance D1 being greater than the distance D2 substantially ensures that the locking tab 345 is below the respective lock surface 1000 of the slat seal tracks 270 before the seal locking mechanism 202 moves into the unbowed position 350 (see FIG. 10B) to lock the seal panel 201 with the slat seal tracks 270.

Retraction of the slat rib 251 in direction 900 causes the slat rib 251 to press or push on the resilient control portion 342 in direction 890 causing the seal locking mechanism 202 to move to the bowed position 800, unlocking or disengaging the seal locking mechanism 202 from the slat seal tracks 270. The distance D1 being greater than the distance D2 may also provide for engagement of the of the slat rib bearing surfaces 360 (upon retraction of the slat rib 251) with the slat rib extension rails 710 prior to any substantial movement of the resilient control portion 342 by the slat rib 251 which may reduce wear on the locking tab 345 when unlocking or disengaging the seal locking mechanism 202 from the slat seal tracks 270. For example, limiting movement of the seal panel 201 in direction 911 (FIG. 9B) so that the slat rib 251 may push on the seal locking mechanism 202 as the slat rib 251 is retracted may be provided by engagement of the slat rib bearing surfaces 360 with the slat rib extension rails 710 and/or engagement of the lateral sides 300 with the slat seal tracks 270 rather than engagement between the locking tab 345 and the respective lock surface 1000.

Referring to FIGS. 4A-4C, in one aspect, the seal panel 201 comprises a plurality of guide rollers 400 disposed along each of the lateral sides 300. In this aspect, the plurality of guide rollers 400 is configured to engage the slat seal tracks 270 (FIG. 2B) and may reduce friction between the lateral sides 300 and the slat seal tracks 270. In one aspect, each of the plurality of guide rollers 400 is additively manufactured in-situ with the seal panel 201. For example, selective laser sintering (SLS) or other suitable additive manufacturing process may be employed to "print" the seal 200 (inclusive of the plurality of guide rollers 400) so that a running clearance is provided between each of the plurality of guide rollers 400 and the respective axle 520 (FIG. 5B or 5C) as the seal panel 201, seal locking mechanism 202, and plurality of guide rollers 400 are additively manufactured and are assembled by virtue of the additive manufacturing process. In this aspect, the plurality of guide rollers 400 may be formed of the same material as the seal panel 201 and the seal locking mechanism 202.

In other aspects, the each of the plurality of guide rollers 400 comprises a material that is different than a material of the seal panel 201. For example, the seal panel 201 may be constructed of a polymer while the plurality of guide rollers 400 is constructed of a metal such as aluminum, titanium, steel, etc. In this aspect, the plurality of guide rollers 400 may be provided as inserts to the additive manufacturing process where the seal panel 201 is additively formed around the rollers 361. For example, referring also to FIG. 5B, each of the plurality of guide rollers 400 includes an axle 520 and a bearing 522 such that the seal panel 201 is additively manufactured around the bearing 522 (e.g., the axle is additively formed with the seal panel 201) so that the bearing 522 is retained on the seal panel 201. In still other aspects, referring also to FIG. 5C the seal panel 201 may be formed with apertures 540 and each of the plurality of guide rollers 400 may be provided as a kit of parts so as to form a roller-axle assembly 530. Here the bearing 522 may be inserted into a respective bearing aperture 545 of the seal panel 201 and the axle 520 is inserted through a respective aperture 540 so as to capture the bearing 522 within the respective bearing aperture 545 in a manner substantially similar to that shown in FIG. 5B. The axle 520 may be retained within the aperture 540 in any suitable manner such as by sonic welding, adhesives, friction, mechanical fasteners, etc. In still other aspects, the roller-axle assembly 530 may be provided as an insert in the additive manufacturing process such that the seal panel is formed around the roller-axle assembly 530.

Referring to FIGS. 2C, 9A, 9B, 10A, 10B, and 11, an exemplary method for sealing a slat track opening 280 on a wing 102 of an aircraft 100 with a seal 200 will be described. The method comprises positioning a seal panel 201 substantially within the slat track opening 280 (FIG. 11, Block 1100) under impetus of a displacement of an actuator 250, where the seal panel 201 has lateral sides 300 that engage slat seal tracks 270 of the wing 102, where the seal 200 includes the seal panel 201 and a seal locking mechanism 202 coupled to the seal panel 201. Here the seal panel 201 is movably coupled to the actuator 250 through an engagement between slat rib extension rails 710 extending from the actuator 250 and slat rib bearing surfaces 360 of the seal 200, where the seal locking mechanism 202 biases the slat rib bearing surfaces 360 against the slat rib extension rails 710. The method may also include maintaining the seal locking mechanism 202 in a bowed position 800 with engagement between the slat rib extension rails 710 and the slat rib bearing surfaces 360.

The method also comprises locking the seal locking mechanism 202 with a lock surface 1000 of the slat seal tracks 270 (FIG. 11, Block 1110), where the seal locking mechanism 202 resiliently moves under the impetus of the displacement of the actuator 250 such that the seal locking mechanism 202 engages the lock surface 1000 of the slat seal tracks 270. The seal locking mechanism 202 resiliently moves under the impetus of the displacement of the actuator 250 between a bowed position 800 and an unbowed position 350. Here, the actuator 250 comprises a slat rib 251 that is displaced to a position forward of a leading edge 102E of the wing 102 to resiliently move the seal locking mechanism 202 from a bowed position 800 to an unbowed position 350 such that the seal locking mechanism 202 engages the lock surface 1000 of the slat seal tracks 270. The method may also include disengaging the slat rib bearing surfaces 360 from the slat rib extension rails 710 after the seal locking mechanism 202 engages the lock surface 1000 of the slat seal tracks 270. In one aspect, the slat rib bearing surfaces 360 are disengaged from the slat rib extension rails 710 substantially simultaneously with engagement of the seal locking mechanism 202 with the lock surface 1000 of the slat seal tracks 270.

The method also comprises unlocking the seal locking mechanism 202 from the lock surface 1000 of the slat seal tracks 270 (FIG. 11. Block 1120), where the seal locking mechanism 202 resiliently moves under the impetus of the displacement of the actuator 250 from an unbowed position 350 to a bowed position 800 such that the seal locking mechanism 202 disengages the lock surface 1000 of the slat seal tracks 270. Here, the actuator 250 comprises a slat rib 251 that is displaced to a position substantially aligned with a leading edge 102E of the wing 102 to resiliently move the seal locking mechanism 202 from the unbowed position 350 to the bowed position 800 such that the seal locking mechanism 202 disengages the lock surface 1000 of the slat seal tracks 270. To disengage the seal locking mechanism 202 from the lock surface 1000, the actuator 250 pushes on the seal locking mechanism 202 such that the seal locking mechanism is resiliently moved from the unbowed position 350 to the bowed position 800. The seal panel 201 may be positioning in a stowed position 266 (FIG. 2A) substantially within the wing 102 under the impetus of the displacement of the actuator 250. Unlocking the seal locking mechanism from the lock surface 1000 method may also include engaging the slat rib bearing surfaces 360 with the slat rib extension rails 710 before the seal locking mechanism 202 disengages the lock surface 1000 of the slat seal tracks 270. In one aspect, the slat rib bearing surfaces 360 are engaged with the slat rib extension rails 710 substantially simultaneously with disengagement of the seal locking mechanism 202 from the lock surface 1000 of the slat seal tracks 270.

The movement of the seal panel 201 is guided by and within the slat seal tracks 270. In one aspect, movement of the seal panel 201 within slat seal tracks 270 is guided with a plurality of guide rollers 400 disposed along the lateral sides 300 of the seal panel 201. The seal panel 201 is at least partially retained within the slat seal tracks 270 with the skin 102S of the wing 102. A panel contour 201C of the seal panel 201 may be changed as the seal panel 201 is positioned within the slat track opening 280 such that the seal panel 201 substantially conforms to a wing contour 299 of a leading edge 102E of the wing 102.

Referring to FIGS. 3A-3C, 4A-4C, 5A-5C, 6A-6D, 12A, and 12B, an exemplary method of forming the seal 200 will be described. The method comprises additively manufacturing a seal panel 201 (FIG. 12A, Block 1200) having lateral sides 300. The method also includes additively manufacturing a seal locking mechanism 202 as a monolithic structure 399 with the seal panel 201 (FIG. 12A, Block 1205). The seal locking mechanism 202 is coupled to the seal panel 201 and is configured to resiliently move, under impetus of an actuator 250, between an unbowed position 350 and a bowed position 800.

Additively manufacturing the seal locking mechanism includes additively manufacturing the seal locking mechanism 202 to a backside surface 311 adjacent a leading edge 201L of the seal panel 201 (FIG. 12A, Block 1210) where the backside surface 311 is opposite an aero-restoration surface 310 of the seal panel 201. In one aspect, the seal locking mechanism 202 is additively manufactured as an arm 340 (FIG. 12A, Block 1215) that is cantilevered from the seal panel 201, wherein the arm 340 has: a pair of flexible locking members 341; and a resilient control portion 342 extending between the flexible locking members 341, where flexure of the resilient control portion 342 effects relative movement of the pair of flexible locking members 341 towards each other and away from each other. Here, the resilient control portion is additively manufactured (FIG. 12A, Block 1216) to include a substantially straight central portion 343; and forward extending bowed portions 344 extending from opposite ends of the substantially straight central portion 343, the forward extending bowed portions 344 couple the substantially straight central portion 343 to the pair of flexible locking members 341. A locking tab 345 is additively manufactured (FIG. 12A, Block 1217) on each flexible locking member 341A, 341B of the pair of flexible locking members 341, the locking tab 345 configured to engage a respective lock surface 1000 of slat seal tracks 270 of a wing 102 of an aircraft 100. The arm 340 is additively manufactured so as to have a U-shaped configuration (FIG. 12A, Block 1218).

The method also includes additively manufacturing slat rib bearing surfaces 360 (FIG. 12A, Block 1220) that are cantilevered from the seal panel 201. The slat rib bearing surfaces 360 comprises rollers 361, and the method further comprising additively manufacturing the rollers 361 in-situ with the seal panel 201 (FIG. 12A, Block 1221). Slat rib bearing surface supports 333 are additively manufactured (FIG. 12A, Block 1222) where the slat rib bearing surface supports 333 are cantilevered from the seal panel 201. In one aspect, the slat rib bearing surface supports 333 include the rollers 361 that are provided as inserts such that the slat rib bearing surface supports 333 are additively manufactured to form axles 420 extending through the rollers 361. In another aspect, the slat rib bearing surface supports 333 include the rollers 361 that are provided as inserts such that the slat rib bearing surface supports 333 are additively manufactured around at least an axle 620 of the rollers 361 so as to couple the rollers 361 to the slat rib bearing surface supports 333.

The method also includes additively manufacturing flexure recesses 370 on a backside surface 311 of the seal panel 201 (FIG. 12A, Block 1230) to effect fore-aft flexure of the seal panel 201 such that the seal panel 201 conforms to a wing contour 299 of the wing 102. Stiffening ribs 371 may be additively manufactured (FIG. 12A, Block 1231) on the backside surface 311 such that the flexure recesses 370 are disposed between adjacent stiffening ribs 371.

In one aspect, the method includes additively manufacturing a plurality of guide rollers 400 (FIG. 12B, Block 1240) in-situ with the seal panel 201, the guide rollers 400 being disposed along the lateral sides 300 and configured to engage slat seal tracks 270 of a wing 102 of an aircraft 100. In one aspect, axles 520 of the guide rollers 400 are additively manufactured (FIG. 12B, Block 1241), where the guide rollers 400 are provided as inserts through which the axles 520 are formed. In another aspect, the seal panel 201 is additively manufactured around at least axles 520 (FIG. 12B, Block 1242) of the guide rollers 400 where the guide rollers 400 are provided as a roller-axle assembly 530.

The seal locking mechanism 202 is additively manufactured with the seal panel 201 so as to be cantilevered from the seal panel 201 (FIG. 12B, Block 1250) and extend from the seal panel 201 along a plane P1 substantially parallel to another plane P2 defined by a major surface 310M of the seal panel 201. At least one stanchion 377 is additively manufactured (FIG. 12B, Block 1260) between the seal panel 201 and the seal locking mechanism 202 such that the at least one stanchion 377 couples the seal locking mechanism 202 to the seal panel 201.

The following are provided in accordance with the aspects of the present disclosure:

A1. A seal 200 comprising:
a seal panel 201 having lateral sides 300; and
a seal locking mechanism 202 coupled to the seal panel 201, the seal locking mechanism 202 being configured to resiliently move, under impetus of an actuator 250, between an unbowed position 350 and a bowed position 800.

A2. The seal 200 of paragraph A1, wherein the seal panel 201 comprises:
a leading edge 201L;
a trailing edge 201T;
an aero-restoration surface 310 extending between the leading edge 201L and the trailing edge 201T;
a backside surface 311 extending between the leading edge 201L and the trailing edge 201T opposite the aero-restoration surface 310; and
wherein the seal locking mechanism 202 is unitarily coupled to the backside surface 311 adjacent the leading edge 201L.

A3. The seal 200 of paragraph A1, wherein the seal panel 201 and the seal locking mechanism 202 form a monolithic structure 399.

A4. The seal 200 of paragraph A1, wherein the seal locking mechanism 202 comprises an arm 340 cantilevered from the seal panel 201, the arm 340 having:
a pair of flexible locking members 341; and
a resilient control portion 342 extending between the flexible locking members 341, where flexure of the resilient control portion 342 effects relative movement of the pair of flexible locking members 341 towards each other and away from each other.

A5. The seal 200 of paragraph A4, wherein the resilient control portion 342 comprises:
a substantially straight central portion 343; and
forward extending bowed portions 344 extending from opposite ends of the substantially straight central portion 343, the forward extending bowed portions 344 couple the substantially straight central portion 343 to the pair of flexible locking members 341.

A6. The seal 200 of paragraph A4, wherein the lateral sides 300 engage slat seal tracks 270 of a wing 102 of an aircraft 100 and each flexible locking member 341A, 341B of the pair of flexible locking members 341 includes a locking tab 345 configured to engage a respective lock surface 1000 of the slat seal tracks 270.

A7. The seal 200 of paragraph A4, wherein the arm 340 has a U-shaped configuration.

A8. The seal 200 of paragraph A1, wherein the actuator 250 is a slat rib 251 of a wing 102 and the seal 200 further comprises slat rib bearing surfaces 360 cantilevered from the seal panel 201.

A9. The seal 200 of paragraph A8, wherein the slat rib bearing surfaces 360 comprise rollers 361 configured to engage slat rib extension rails 710.

10. The seal 200 of paragraph A9, wherein each of the rollers 361 is additively manufactured in-situ with the seal panel 201.

A11. The seal 200 of paragraph A9, wherein each of the rollers 361 comprises a material that is different than a material of the seal panel.

A12. The seal 200 of paragraph A8, wherein the slat rib bearing surfaces 360 are cantilevered from a leading edge 201L of the seal panel 201.

A13. The seal 200 of paragraph A8, wherein a distance D1 between a locking tab 345 of the seal locking mechanism 202 and a leading edge 201L of the seal panel 201 is greater than another distance D2 between an engagement region 360R of the slat rib bearing surfaces 360 and the leading edge 201L of the seal panel 201.

A14. The seal 200 of paragraph A1, wherein the seal panel 201 comprises flexure recesses 370 configured to effect fore-aft flexure of the seal panel 201 such that the seal panel 201 conforms to a wing contour 299 of the wing 102.

A15. The seal 200 of paragraph A14, wherein the seal panel 201 comprises stiffening ribs 371 and the flexure recesses 370 extend between adjacent stiffening ribs 371.

A16. The seal 200 of paragraph A1, wherein the seal panel 201 and seal locking mechanism 202 each comprise a polymer and are fused together through additive manufacturing of the seal 200.

A17. The seal 200 of paragraph A1, wherein the lateral sides 300 engage slat seal tracks 270 of a wing 102 of an aircraft 100 and the seal 200 further comprises a plurality of guide rollers 400 disposed along each of the lateral sides 300, the plurality of guide rollers 400 being configured to engage the slat seal tracks 270.

A18. The seal 200 of paragraph A17, wherein each of the plurality of guide rollers 400 is additively manufactured in-situ with the seal panel 201.

A19. The seal 200 of paragraph A17, wherein each of the plurality of guide rollers 400 comprises a material that is different than a material of the seal panel 201.

A20. The seal 200 of paragraph A1, wherein the seal locking mechanism 202 is cantilevered from the seal panel 201 so as to extend from the seal panel 201 along a plane P1 substantially parallel to another plane P2 defined by a major surface 310M of the seal panel 201.

A21. The seal 200 of paragraph A1, further comprising at least one stanchion 377 that couples the seal locking mechanism 202 to the seal panel 201.

A22. The seal 200 of paragraph A1, wherein the unbowed position 350 is configured to engage the seal locking mechanism 202.

A23. The seal 200 of paragraph A22, wherein the seal 200 is configured for sealing a slat track opening 280 on a wing 102 of an aircraft 100 and the lateral sides 300 of the seal panel 201 engage slat seal tracks 270 of the wing 102, where the unbowed position 350 engages the seal locking mechanism 202 with a lock surface 1000 of the slat seal tracks 270.

A24. The seal 200 of paragraph A1, wherein the bowed position 800 is configured to disengage the seal locking mechanism 202.

A25. The seal 200 of paragraph A24, wherein the seal 200 is configured for sealing a slat track opening 280 on a wing 102 of an aircraft 100 and the lateral sides 300 of the seal panel 201 engage slat seal tracks 270 of the wing 102, where the bowed position 800 disengages the seal locking mechanism 202 from a lock surface 1000 of the slat seal tracks 270.

A26. The seal 200 of paragraph A1, wherein the actuator 250 is a slat rib 251 of a wing 102 of an aircraft 100.

B1. A method for sealing a slat track opening 280 on a wing 102 of an aircraft 100 with a seal 200, the method comprising:

positioning a seal panel 201 substantially within the slat track opening 280 under impetus of a displacement of an actuator 250, where the seal panel 201 has lateral sides 300 that engage slat seal tracks 270 of the wing 102, where the seal 200 includes the seal panel 201 and a seal locking mechanism 202 coupled to the seal panel 201; and locking the seal locking mechanism 202 with a lock surface 1000 of the slat seal tracks 270, where the seal locking mechanism 202 resiliently moves under the impetus of the displacement of the actuator 250 such that the seal locking mechanism 202 engages the lock surface 1000 of the slat seal tracks 270.

B2. The method of paragraph B1, wherein the seal locking mechanism 202 resiliently moves under the impetus of the displacement of the actuator 250 between a bowed position 800 and an unbowed position 350.

B3. The method of paragraph B1, wherein the actuator 250 is a slat rib 251.

B4. The method of paragraph B1, wherein the actuator 250 comprises a slat rib 251 that is displaced to a position forward of a leading edge 102E of the wing 102 to resiliently move the seal locking mechanism 202 from a bowed position 800 to an unbowed position 350 such that the seal locking mechanism 202 engages the lock surface 1000 of the slat seal tracks 270.

B5. The method of paragraph B1, further comprising unlocking the seal locking mechanism 202 from the lock surface 1000 of the slat seal tracks 270, where the seal locking mechanism 202 resiliently moves under the impetus of the displacement of the actuator 250 from an unbowed position 350 to a bowed position 800 such that the seal locking mechanism 202 disengages the lock surface 1000 of the slat seal tracks 270.

B6. The method of paragraph B5, wherein the actuator 250 comprises a slat rib 251 that is displaced to a position substantially aligned with a leading edge 102E of the wing 102 to resiliently move the seal locking mechanism 202 from the unbowed position 350 to the bowed position 800 such that the seal locking mechanism 202 disengages the lock surface 1000 of the slat seal tracks 270.

B7. The method of paragraph B5, wherein the actuator 250 pushes on the seal locking mechanism 202 such that the seal locking mechanism is resiliently moved from the unbowed position 350 to the bowed position 800.

B8. The method of paragraph B1, further comprising positioning the seal panel 201 in a stowed position 266 substantially within the wing 102 under the impetus of the displacement of the actuator 250.

B9. The method of paragraph 1, further comprising:

movably coupling the seal panel 201 to the actuator 250 through an engagement between slat rib extension rails 710 extending from the actuator 250 and slat rib bearing surfaces 360 of the seal 200, where the seal locking mechanism 202 biases the slat rib bearing surfaces 360 against the slat rib extension rails 710.

B10. The method of paragraph B9, further comprising maintaining the seal locking mechanism 202 in a bowed position 800 with engagement between the slat rib extension rails 710 and the slat rib bearing surfaces 360.

B11. The method of paragraph B9, further comprising disengaging the slat rib bearing surfaces 360 from the slat rib extension rails 710 after the seal locking mechanism 202 engages the lock surface 1000 of the slat seal tracks 270.

B12. The method of paragraph B9, further comprising disengaging the slat rib bearing surfaces 360 from the slat rib extension rails 710 substantially simultaneously with engagement of the seal locking mechanism 202 with the lock surface 1000 of the slat seal tracks 270.

B13. The method of paragraph B9, further comprising engaging the slat rib bearing surfaces 360 with the slat rib extension rails 710 before the seal locking mechanism 202 disengages the lock surface 1000 of the slat seal tracks 270.

B14. The method of paragraph B9, further comprising engaging the slat rib bearing surfaces 360 with the slat rib extension rails 710 substantially simultaneously with disengagement of the seal locking mechanism 202 from the lock surface 1000 of the slat seal tracks 270.

B15. The method of paragraph B1, further comprising guiding movement of the seal panel 201 within slat seal tracks 270.

B16. The method of paragraph B1, further comprising guiding movement of the seal panel 201 within slat seal tracks 270 with a plurality of guide rollers 400 disposed along the lateral sides 300 of the seal panel 201.

B17. The method of paragraph B1, further comprising changing a panel contour 201C of the seal panel 201 as the seal panel 201 is positioned within the slat track opening 280 such that the seal panel 201 substantially conforms to a wing contour 299 of a leading edge 102E of the wing 102.

B18. The method of paragraph B1, further comprising, at least partially retaining the seal panel 201 within the slat seal tracks 270 with a skin 102S of the wing 102.

C1. A method of forming a seal 200, the method comprising:
additively manufacturing as a monolithic structure 399:
a seal panel 201 having lateral sides 300; and
a seal locking mechanism 202 coupled to the seal panel 201, the seal locking mechanism 202 being configured to resiliently move, under impetus of an actuator 250, between an unbowed position 350 and a bowed position 800.

C2. The method of paragraph C1, further comprising additively manufacturing the seal locking mechanism 202 to a backside surface 311 adjacent a leading edge 201L of the seal panel 201, where the backside surface 311 is opposite an aero-restoration surface 310 of the seal panel 201.

C3. The method of paragraph C1, further comprising additively manufacturing the seal locking mechanism 202 as an arm 340 that is cantilevered from the seal panel 201, wherein the arm 340 has:
a pair of flexible locking members 341; and
a resilient control portion 342 extending between the flexible locking members 341, where flexure of the resilient control portion 342 effects relative movement of the pair of flexible locking members 341 towards each other and away from each other.

C4. The method of paragraph C3, further comprising additively manufacturing the resilient control portion 342 to include:
a substantially straight central portion 343; and
forward extending bowed portions 344 extending from opposite ends of the substantially straight central portion 343, the forward extending bowed portions 344 couple the substantially straight central portion 343 to the pair of flexible locking members 341.

C5. The method of paragraph C3, further comprising additively manufacturing a locking tab 345 on each flexible locking member 341A, 341B of the pair of flexible locking members 341, the locking tab 345 configured to engage a respective lock surface 1000 of slat seal tracks 270 of a wing 102 of an aircraft 100.

C6. The method of paragraph 3, wherein the arm 340 is additively manufactured so as to have a U-shaped configuration.

C7. The method of paragraph C1, further comprising additively manufacturing slat rib bearing surfaces 360 that are cantilevered from the seal panel 201.

C8. The method of paragraph C7, wherein the slat rib bearing surfaces 360 comprises rollers 361, the method further comprising additively manufacturing the rollers 361 in-situ with the seal panel 201.

C9. The method of paragraph C7, further comprising additively manufacturing slat rib bearing surface supports 333 that are cantilevered from the seal panel 201, wherein the slat rib bearing surface supports 333 include the rollers 361 that are provided as inserts such that the slat rib bearing surface supports 333 are additively manufactured to form axles 420 extending through the rollers 361.

C10. The method of paragraph C7, further comprising additively manufacturing slat rib bearing surface supports 333 that are cantilevered from the seal panel 201, wherein the slat rib bearing surface supports 333 include the rollers 361 that are provided as inserts such that the slat rib bearing surface supports 333 are additively manufactured around at least an axle 620 of the rollers 361 so as to couple the rollers 361 to the slat rib bearing surface supports 333.

C11. The method of paragraph C1, further comprising additively manufacturing flexure recesses 370 on a backside surface 311 of the seal panel 201 to effect fore-aft flexure of the seal panel 201 such that the seal panel 201 conforms to a wing contour 299 of the wing 102.

C12. The method of paragraph C11, further comprising additively manufacturing stiffening ribs 371 on the backside surface 311 such that the flexure recesses 370 are disposed between adjacent stiffening ribs 371.

C13. The method of paragraph C1, further comprising additively manufacturing a plurality of guide rollers 400 in-situ with the seal panel 201, the guide rollers 400 being disposed along the lateral sides 300 and configured to engage slat seal tracks 270 of a wing 102 of an aircraft 100.

C14. The method of paragraph C13, further comprising additively manufacturing axles 520 of the guide rollers 400, where the guide rollers 400 are provided as inserts through which the axles 520 are formed.

C15. The method of paragraph C13, further comprising additively manufacturing the seal panel 201 around at least axles 520 of the guide rollers 400 where the guide rollers 400 are provided as a roller-axle assembly 530.

C16. The method of paragraph C1, wherein the seal locking mechanism 202 is additively manufactured with the seal panel 201 so as to be cantilevered from the seal panel 201 and extend from the seal panel 201 along a plane P1 substantially parallel to another plane P2 defined by a major surface 310M of the seal panel 201.

C17. The method of paragraph C1, wherein at least one stanchion 377 is additively manufactured between the seal panel 201 and the seal locking mechanism 202 such that the at least one stanchion 377 couples the seal locking mechanism 202 to the seal panel 201.

D1. An aircraft 100 comprising:
a wing 102 having a slat track opening 280; and
a seal 200 for sealing the slat track opening 280, the seal 200 including:
a seal panel 201 having lateral sides 300; and
a seal locking mechanism 202 coupled to the seal panel 201, the seal locking mechanism 202 being configured to resiliently move, under impetus of an actuator 250, between an unbowed position 350 and a bowed position 800.

D2. The aircraft 100 of paragraph D1, wherein the seal panel comprises:
a leading edge 201L;
a trailing edge 201T;
an aero-restoration surface 310 extending between the leading edge 201L and the trailing edge 201T;
a backside surface 311 extending between the leading edge 201L and the trailing edge 201T opposite the aero-restoration surface 310; and
wherein the seal locking mechanism 202 is unitarily coupled to the backside surface 311 adjacent the leading edge 201L.

D3. The aircraft 100 of paragraph D1, wherein the seal panel 201 and the seal locking mechanism 202 form a monolithic structure 399.

D4. The aircraft 100 of paragraph D1, wherein the seal locking mechanism 202 comprises an arm 340 cantilevered from the seal panel 201, the arm 340 having:
a pair of flexible locking members 341; and
a resilient control portion 342 extending between the flexible locking members 341, where flexure of the resilient control portion 342 effects relative movement of the pair of flexible locking members 341 towards each other and away from each other.

D5. The aircraft 100 of paragraph D4, wherein the resilient control portion 342 comprises:
a substantially straight central portion 343; and
forward extending bowed portions 344 extending from opposite ends of the substantially straight central portion 343, the forward extending bowed portions 344 couple the substantially straight central portion 343 to the pair of flexible locking members 341.

D6. The aircraft 100 of paragraph D4, wherein the lateral sides 300 engage slat seal tracks 270 of a wing 102 of an aircraft 100 and each flexible locking member 341A, 341B of the pair of flexible locking members 341 includes a locking tab 345 configured to engage a respective lock surface 1000 of the slat seal tracks 270.

D7. The aircraft 100 of paragraph D4, wherein the arm 340 has a U-shaped configuration.

D8. The aircraft of paragraph D1, wherein the actuator 250 is a slat rib 251 of a wing 102 and the seal 200 further comprises slat rib bearing surfaces 360 cantilevered from the seal panel 201.

D9. The aircraft 100 of paragraph D8, wherein the slat rib bearing surfaces 360 comprise rollers 361 configured to engage slat rib extension rails 710.

D10. The aircraft 100 of paragraph D9, wherein each roller 361 is additively manufactured in-situ with the seal panel 201.

D11. The aircraft 100 of paragraph D9, wherein each roller 361 comprises a material that is different than a material of the seal panel.

D12. The aircraft 100 of paragraph D8, wherein the slat rib bearing surfaces 360 are cantilevered from a leading edge 201L of the seal panel 201.

D13. The aircraft 100 of paragraph D8, wherein a distance D1 between a locking tab 345 of the seal locking mechanism 202 and a leading edge 201L of the seal panel 201 is greater than another distance D2 between the an engagement region 360R of the slat rib bearing surfaces 360 and the leading edge 201L of the seal panel 201.

D14. The aircraft 100 of paragraph D1, wherein the seal panel 201 comprises flexure recesses 370 configured to effect fore-aft flexure of the seal panel 201 such that the seal panel 201 conforms to a wing contour 299 of the wing 102.

D15. The aircraft 100 of paragraph D14, wherein the seal panel 201 comprises stiffening ribs 371 and the flexure recesses 370 extend between adjacent stiffening ribs 371.

D16. The aircraft 100 of paragraph D1, wherein the seal panel 201 and seal locking mechanism 202 each comprise a polymer and are fused together through additive manufacturing of the seal 200.

D17. The aircraft 100 of paragraph D1, wherein the lateral sides 300 engage slat seal tracks 270 of a wing 102 of an aircraft 100 and the seal 200 further comprises a plurality of guide rollers 400 disposed along each of the lateral sides 300, the plurality of guide rollers 400 being configured to engage the slat seal tracks 270.

D18. The aircraft 100 of paragraph D17, wherein each of the plurality of guide rollers 400 is additively manufactured in-situ with the seal panel 201.

D19. The aircraft 100 of paragraph D17, wherein each of the plurality of guide rollers 400 comprise a material that is different than a material of the seal panel 201.

D20. The aircraft 100 of paragraph D1, wherein the seal locking mechanism 202 is cantilevered from the seal panel 201 so as to extend from the seal panel 201 along a plane P1 substantially parallel to another plane P2 defined by a major surface 310M of the seal panel 201.

D21. The aircraft 100 of paragraph D1, further comprising at least one stanchion 377 that couples the seal locking mechanism 202 to the seal panel 201.

D22. The aircraft 100 of paragraph D1, wherein the unbowed position 350 is configured to engage the seal locking mechanism 202.

D23. The aircraft 100 of paragraph D22, wherein the lateral sides 300 of the seal panel 201 engage slat seal tracks 270 of the wing 102, where the unbowed position 350 engages the seal locking mechanism 202 with a lock surface 1000 of the slat seal tracks 270.

D24. The aircraft 100 of paragraph D1, wherein the bowed position 800 is configured to disengage the seal locking mechanism 202 from a lock surface 1000 of the slat seal tracks 270.

D25. The aircraft 100 of paragraph D24, wherein the lateral sides 300 of the seal panel 201 engage slat seal tracks 270 of the wing 102, where the bowed position 800 disengages the seal locking mechanism 202 from the lock surface 1000 of the slat seal tracks 270.

D26. The aircraft 100 of paragraph D1, wherein the actuator 250 is a slat rib 251 of a wing 102 of an aircraft 100.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 11, 12A, and 12B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11, 12A, and 12B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts are described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A seal system comprising:
   a pair of spaced apart tracks forming an opening therebetween;
   a seal panel having lateral sides and an aero-restoration surface that is shaped and sized to seal the opening; and
   a seal locking mechanism coupled to the seal panel, the seal locking mechanism being configured to resiliently move, under impetus of an actuator, between an unbowed position and a bowed position.

2. The seal of claim 1, wherein the seal panel and the seal locking mechanism form a monolithic structure.

3. The seal of claim 1, wherein the seal locking mechanism comprises an arm cantilevered from the seal panel, the arm having:
   a pair of flexible locking members; and
   a resilient control portion extending between the flexible locking members, where flexure of the resilient control portion effects relative movement of the pair of flexible locking members towards each other and away from each other.

4. The seal of claim 3, wherein the resilient control portion comprises:
   a substantially straight central portion; and
   forward extending bowed portions extending from opposite ends of the substantially straight central portion, the forward extending bowed portions couple the substantially straight central portion to the pair of flexible locking members.

5. The seal of claim 3, wherein the lateral sides engage the pair of spaced apart tracks of a wing of an aircraft and each flexible locking member of the pair of flexible locking members includes a locking tab configured to engage a respective lock surface of the pair of spaced apart tracks.

6. The seal of claim 1, wherein the actuator is a slat rib of a wing and the seal further comprises slat rib bearing surfaces cantilevered from the seal panel.

7. The seal of claim 6, wherein the slat rib bearing surfaces comprise rollers configured to engage slat rib extension rails.

8. The seal of claim 1, wherein the seal panel and seal locking mechanism each comprise a polymer and are fused together through additive manufacturing of the seal.

9. The seal of claim 1, wherein the lateral sides engage the pair of spaced apart tracks of a wing of an aircraft and the seal further comprises a plurality of guide rollers disposed along each of the lateral sides, the plurality of guide rollers being configured to engage the pair of spaced apart tracks.

10. A method for sealing a slat track opening on a wing of an aircraft with a seal, the method comprising:
    positioning a seal panel substantially within the slat track opening under impetus of a displacement of an actuator, where the seal panel has lateral sides that engage slat seal tracks of the wing, where the seal includes the seal panel and a seal locking mechanism coupled to the seal panel; and
    locking the seal locking mechanism with a lock surface of the slat seal tracks, where the seal locking mechanism resiliently moves under the impetus of the displacement of the actuator such that the seal locking mechanism engages the lock surface of the slat seal tracks.

11. The method of claim 10, wherein the seal locking mechanism resiliently moves under the impetus of the displacement of the actuator between a bowed position and an unbowed position.

12. The method of claim 10, wherein the actuator comprises a slat rib that is displaced to a position forward of a leading edge of the wing to resiliently move the seal locking mechanism from a bowed position to an unbowed position such that the seal locking mechanism engages the lock surface of the slat seal tracks.

13. The method of claim 10, further comprising unlocking the seal locking mechanism from the lock surface of the slat seal tracks, where the seal locking mechanism resiliently moves under the impetus of the displacement of the actuator from an unbowed position to a bowed position such that the seal locking mechanism disengages the lock surface of the slat seal tracks.

14. The method of claim 13, wherein the actuator pushes on the seal locking mechanism such that the seal locking mechanism is resiliently moved from the unbowed position to the bowed position.

15. The method of claim 10, further comprising:
    movably coupling the seal panel to the actuator through an engagement between slat rib extension rails extending from the actuator and slat rib bearing surfaces of the seal, where the seal locking mechanism biases the slat rib bearing surfaces against the slat rib extension rails.

16. An aircraft comprising:
    a wing having a slat track opening; and
    a seal for sealing the slat track opening, the seal including:
       a seal panel having lateral sides; and
       a seal locking mechanism coupled to the seal panel, the seal locking mechanism being configured to resiliently move, under impetus of an actuator, between an unbowed position and a bowed position.

17. The aircraft of claim 16, wherein the seal locking mechanism comprises an arm cantilevered from the seal panel, the arm having:
    a pair of flexible locking members; and
    a resilient control portion extending between the flexible locking members, where flexure of the resilient control portion effects relative movement of the pair of flexible locking members towards each other and away from each other.

18. The aircraft of claim 17, wherein the arm has a U-shaped configuration.

19. The aircraft of claim 16, wherein the unbowed position is configured to engage the seal locking mechanism.

20. The aircraft of claim 16, wherein the bowed position is configured to disengage the seal locking mechanism from a lock surface of the slat seal tracks.

* * * * *